(12) United States Patent
Wang et al.

(10) Patent No.: US 10,692,450 B2
(45) Date of Patent: Jun. 23, 2020

(54) DISPLAY PANEL, DISPLAY DEVICE, AND DRIVING METHOD

(71) Applicant: Xiamen Tianma Micro-Electronics Co.,Ltd., Xiamen (CN)

(72) Inventors: Jianxun Wang, Xiamen (CN); Hongbo Zhou, Xiamen (CN); Wenbin Yang, Xiamen (CN)

(73) Assignee: XIAMEN TIANMA MICRO-ELECTRONICS CO.,LTD., Xiamen (CN)

( * ) Notice: Subject to any disclaimer, the term of this patent is extended or adjusted under 35 U.S.C. 154(b) by 96 days.

(21) Appl. No.: 15/994,937

(22) Filed: May 31, 2018

(65) Prior Publication Data

US 2019/0251918 A1    Aug. 15, 2019

(30) Foreign Application Priority Data

Feb. 13, 2018   (CN) .......................... 2018 1 0149771

(51) Int. Cl.
*G09G 3/36* (2006.01)
*G02F 1/1362* (2006.01)
(Continued)

(52) U.S. Cl.
CPC ......... *G09G 3/3614* (2013.01); *G02F 1/1368* (2013.01); *G02F 1/134309* (2013.01);
(Continued)

(58) Field of Classification Search
CPC .......... G09G 5/003; G09G 5/006; G09G 5/18; G09G 5/12; G09G 2310/08; G09G 2370/14; G09G 2370/08; G09G 3/3614; G09G 3/2003; G09G 3/3688; G09G 2310/0297; H04L 25/14; H04L 25/0272;
(Continued)

(56) References Cited

U.S. PATENT DOCUMENTS 7,505,053 B2 *   3/2009  Brown Elliott ... G02F 1/133514
                                                    345/694
8,199,102 B2 *   6/2012  Lee ...................... G09G 3/3688
                                                    345/100
(Continued)

FOREIGN PATENT DOCUMENTS

CN    103996383 A1    8/2014
CN    105405416 A1    3/2016
CN    106292086 A1    1/2017

*Primary Examiner* — Grant Sitta
(74) *Attorney, Agent, or Firm* — Alston & Bird LLP

(57) ABSTRACT

The present disclosure provides a display panel, display device and driving method thereof. The display panel includes: N pixel column unit groups, each including a first pixel column unit and a second pixel column unit; N data line unit groups one-to-one corresponding to the N pixel column unit groups, each including a first data line unit and a second data line unit; N driving unit groups one-to-one corresponding to the N data line unit groups, each including a first driving unit and a second driving unit; and N data output groups corresponding to the N driving unit groups in one-to-one correspondence, each including a first data output and a second data output, and a polarity of data signal output from the first data output is opposite to a polarity of data signal output from the second data output.

15 Claims, 17 Drawing Sheets

(51) Int. Cl.
 *G02F 1/1368* (2006.01)
 *G09G 3/20* (2006.01)
 *G02F 1/1343* (2006.01)

(52) U.S. Cl.
 CPC ..... *G02F 1/136286* (2013.01); *G09G 3/2003* (2013.01); *G09G 3/3688* (2013.01); *G02F 2201/121* (2013.01); *G02F 2201/123* (2013.01)

(58) Field of Classification Search
 CPC .............. H03K 19/018585; G06F 3/14; G02F 1/134309; G02F 1/1368; G02F 1/136286; G02F 2201/121; G02F 2201/123
 See application file for complete search history.

(56) References Cited

U.S. PATENT DOCUMENTS

| | | | | |
|---|---|---|---|---|
| 9,129,569 B2 * | 9/2015 | Kitayama | ............ | G09G 3/3651 |
| 9,224,348 B2 * | 12/2015 | Kim | ..................... | G09G 3/3614 |
| 9,437,153 B2 * | 9/2016 | Takahashi | ............ | G09G 3/3688 |
| 9,589,515 B2 * | 3/2017 | Yang | ..................... | G09G 3/3614 |
| 9,715,861 B2 * | 7/2017 | Kim | ..................... | G09G 3/3696 |
| 9,952,474 B2 * | 4/2018 | Wang | ................ | G02F 1/136213 |
| 10,049,638 B2 * | 8/2018 | Lin | ..................... | G09G 3/3688 |
| 10,510,315 B2 * | 12/2019 | Zhou | ..................... | G09G 3/3614 |
| 2007/0040764 A1 * | 2/2007 | Kim | ..................... | G09G 3/3291 |
| | | | | 345/30 |
| 2008/0278466 A1 * | 11/2008 | Joo | ..................... | G09G 3/3614 |
| | | | | 345/205 |
| 2011/0249046 A1 * | 10/2011 | Lee | ..................... | G09G 3/3688 |
| | | | | 345/691 |
| 2011/0299023 A1 * | 12/2011 | Lee | ..................... | G02F 1/1368 |
| | | | | 349/143 |
| 2014/0232624 A1 * | 8/2014 | Kim | ..................... | G09G 3/3696 |
| | | | | 345/87 |
| 2018/0047353 A1 * | 2/2018 | Lin | ..................... | G09G 3/36 |
| 2018/0356676 A1 * | 12/2018 | Chen | ..................... | G02F 1/1345 |

* cited by examiner

DISPLAY PANEL, DISPLAY DEVICE, AND DRIVING METHOD

CROSS-REFERENCE TO RELATED APPLICATIONS

The present application claims priority to Chinese Patent Application No. CN 201810149771.5, filed on Feb. 13, 2018, the content of which is incorporated herein by reference in its entirety.

TECHNICAL FIELD

The present application relates to the field of display technologies, and in particular, to a display panel, a display device, and a driving method.

BACKGROUND

With the development of the liquid crystal technology, the application of liquid crystal displays is becoming more popular in people's daily life. In the field of the liquid crystal display technology, liquid crystal display panels are becoming thinner and lighter, and the power consumption is getting lower.

In the related art of the liquid crystal display, in order to prevent permanent damage caused by polarization of liquid crystal materials, it is usually necessary to perform polarity inversion driving on the liquid crystal materials. The common polarity inversion methods include: frame inversion, column inversion, line inversion, and point inversion. In the case of frame inversion, line inversion, or column inversion, it appears that all sub-pixels having a certain color will be charged at a voltage with one polarity when a certain frame is displayed, and when the next frame is displayed these sub-pixels will then be charged at the same time at with the voltage with another polarity. This switch can result in a flicker phenomenon occurring when switching between two frames of images, thereby affecting the display effect.

How to alleviate the frame switch caused flickering of a solid color image in a liquid crystal display panel becomes a major technical problem.

SUMMARY

The present disclosure provides a display panel, a display device, and a driving method, which are used to avoid flickering of a display image and thus improve the display quality.

In a first aspect, the present disclosure provides a display panel. The display panel includes N pixel column unit groups. Each of the N pixel column unit groups includes a first pixel column unit and a second pixel column unit. Each of the first pixel column unit and the second pixel column unit includes a first column of pixels, a second column of pixels, a third column of pixels, and a fourth column of pixels. All colors of pixels of the first column of pixels are identical to all colors of pixels of the third column of pixels and all colors of pixels of the second column of pixels are identical to all colors of pixels of the fourth column of pixels. Pixels in the N pixel column unit groups includes first color pixels, second color pixels, third color pixels, and fourth color pixels. The display panel further includes N data line unit groups corresponding to the N pixel column unit groups in one-to-one correspondence. Each of the N data line unit groups includes a first data line unit and a second data line unit. Each of the first data line unit and the second data line unit includes four data lines. The four data lines in the first data line unit of each of the N data line unit groups are electrically connected to the first column of pixels, the second column of pixels, the third column of pixels, and the fourth column of pixels in the first pixel column unit of a corresponding pixel column unit group of the N pixel column unit group in one-to-one correspondence, and the four data lines in the second data line unit of each of the N data line unit groups are electrically connected to the first column of pixels, the second column of pixels, the third column of pixels, and the fourth column of pixels in the second pixel column unit of a corresponding pixel column unit group of the N pixel column unit group in one-to-one correspondence. The display panel further includes N driving unit groups corresponding to the N data line unit groups in one-to-one correspondence. Each of the N driving unit groups includes a first driving unit and a second driving unit, and each of the first driving unit and the second driving unit includes four switch element groups, each of which has a first terminal and a second terminal. The first terminals of the four switch element groups in the first driving unit of each of the N driving unit groups are electrically connected to said four data lines in the first data line unit of a corresponding data line unit group of the N data line unit groups in one-to-one correspondence, and first terminals of the four switch element groups in the second driving unit of each of the N driving unit groups are electrically connected to said four data lines in a second data line unit of a corresponding data line unit group of the N data line unit groups in one-to-one correspondence. The display panel further includes N data output groups corresponding to the N driving unit groups in one-to-one correspondence. Each of the N data output groups includes a first data output and a second data output, and a polarity of a data signal output from the first data output is opposite to a polarity of a data signal output from the second data output. The second terminals of two switch element groups in the first driving unit of each of the N driving unit groups are electrically connected to the first data output of a corresponding data output group of the N data output groups, and the second terminals of the other two switch element groups in the first driving unit of each of the N driving unit groups are electrically connected to the second data output of the corresponding data output group of the N data output groups. At least one color of pixels in one column of two columns of pixels corresponding to the two switch element groups of the first driving unit connected to the first data output are different from at least one color of pixels in the other one column of the two columns of pixels corresponding to the two switch element groups of the first driving unit connected to the first data output, and at least one color of pixels of one column of the other two columns of pixels corresponding to the other two switch element groups of the first driving unit connected to the second data output are different from at least one color of pixels of the other one column of the other two columns of pixels corresponding to the other two switch element groups of the first driving unit connected to the second data output. The second terminals of two switch element groups in the second driving unit of each of the N driving unit groups are electrically connected to the first data output of a corresponding data output group of the N data output groups, and the second terminals of the other two switch element groups in the second driving unit of each of the N driving unit groups are electrically connected to the second data output of the corresponding data output group of the N data output groups. At least one color of pixels in one column of two columns of pixels corresponding to the two switch element groups of the second driving unit connected to the first data output are different from at least one color of pixels in the other one column of the two columns of pixels corresponding to the two switch element groups of the second driving unit connected to the first data output, and at least one color of pixels in one column of the other two columns of pixels corresponding to the other two switch element groups of the second driving unit connected to the second data output are different from at least one color of pixels in the other one column of the other two columns of pixels corresponding to the other two switch element groups of the second driving unit connected to the second data output. N is a positive integer.

In a second aspect, the present disclosure provides a display device, and the display device includes the abovementioned display panel.

In a third aspect, the present disclosure provides a driving method for the abovementioned display panel. The driving method for the display panel includes steps of: providing the first data output and the second data output of each of the N data output groups with data signals having opposite polarities; and providing an enable signal to the four switch element groups in the first driving unit and the four switch element groups in the second driving unit of each of the N driving unit groups, so that a first terminal and a second terminal of each of the four switch element groups in the first driving unit and the four switch element groups in the second driving unit of each of the N driving unit groups are switched on, and the data signals are transmitted to respective columns of pixel.

BRIEF DESCRIPTION OF DRAWINGS

In order to more clearly illustrate technical solutions in embodiments of the present disclosure or in the related art, the accompanying drawings used in the embodiments and in the related art are briefly introduced as follows. Obviously, the drawings described as follows are merely part of the embodiments of the present disclosure, other drawings can also be acquired by those skilled in the art without paying creative efforts

DESCRIPTION OF EMBODIMENTS

In order to make the purpose, technical solutions, and advantages of the embodiments of the present disclosure to be more clear, the technical solutions in the embodiments of the present disclosure are clearly and completely described in the following with reference to the accompanying drawings in the embodiments of the present disclosure. Obviously, the described embodiments are merely exemplary embodiments of the present disclosure, which shall not be interpreted as limiting the present disclosure. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., An existing individually, A and B existing simultaneously, B existing individually. In addition, the character "I" herein generally indicates that the related objects before and after the character form an "or" relationship.

It should be understood that, although the color pixel may be described using the terms of "first", "second", "third", "fourth", etc., in the embodiments of the present disclosure, the color pixel will not be limited to these terms. These terms are merely used to distinguish color pixels from one another. For example, without departing from the scope of the embodiments of the present disclosure, a first color pixel may also be referred to as a second color pixel, similarly, a second color pixel may also be referred to as a first color pixel.

It should be noted that, the expressions such as "upper", "lower", "left", "right" and the like mentioned in embodiments of the present disclosure are described with reference to the placement status in the accompanying drawings, and should not be construed as limiting embodiments of the present disclosure. In addition, it should also be understood that, in the context, while referring to an element being formed "above" or "below" another element, it is possible that the element is directly formed "above" or "below" the other element, it is also possible that the element is formed "above" or "below" the other element via an intermediate element.

Figure 1:
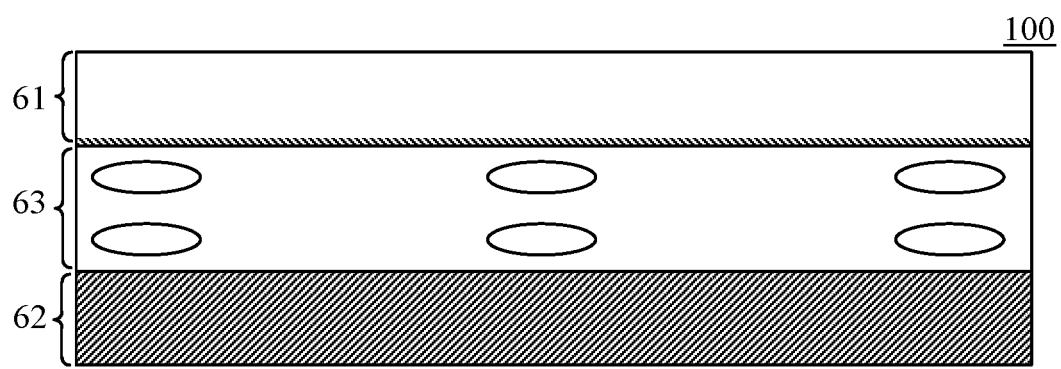
FIG. 1 is a structural cross sectional diagram of a display panel according to an embodiment of the present disclosure.

The display principle of the display panel involved in the embodiments will be briefly described in the following before describing the present disclosure in details. As shown in FIG. 1, it is a structural schematic diagram of a display panel according to an embodiment of the present disclosure. The display panel 100 in the embodiments can be understood as a liquid crystal display panel, and the liquid crystal display panel includes an array substrate 62, a color film substrate 61 disposed opposite to the array substrate 62, and a liquid crystal layer 63 disposed between the array substrate 62 and the color film substrate 61. The array substrate 62 is provided thereon with a plurality of pixels (not shown) defined by a plurality of rows of gate lines (not shown) intersecting a plurality of columns of data lines (not shown). Further, each pixel is provided therein with a thin film transistor (not shown), a pixel electrode (not shown) and a common electrode (not shown). Each thin film transistor has a gate electrode connected to a gate line, a source electrode connected to a data line, and a drain electrode connected to a pixel electrode. Under the control of the corresponding gate line, a data line corresponding to the source electrode of the thin film transistor performs charging and discharging on the pixel electrode corresponding to the drain electrode through the thin film transistor, and an electric field is formed between the pixel electrode and the common electrode. When the liquid crystal display panel performs displaying, the common electrode receives a common electrical signal (usually a constant voltage signal), and an electric field is formed between the pixel electrode and the common electrode, which controls deflection of liquid crystal molecules in the liquid crystal layer, so as to allow light of the backlight to be transmitted, thereby achieving the display function.

In the related art, regardless of the arrangement manner of the pixels, when a solid color image appears on the display panel, for example, when a red image appears on the display panel, if all the red pixels of the display panel are needed to transform from a signal (for example, at this moment, a deflection angle of the liquid crystal molecules is $\alpha$) to another signal (at this moment, a deflection angle of the liquid crystal molecules is $-\alpha$), such a transformation can be referred to as a polarity inversion. At this time, if the liquid crystal molecules stay in a constant electric field for a long time, the characteristics of the liquid crystal molecules will be destroyed (the liquid crystal molecules are deflected along with the change of the electric field), and some liquid crystals will not respond to the change of the electric field, resulting in inaccurate deflection angles of some liquid crystal molecules, thereby leading to different light-transmission amounts of some liquid crystal molecules, which causes a different screen brightness after deflection of the liquid crystal molecules. Therefore, if the display panel is in a polarity inversion, data signals received by pixels having a same color will change from one polarity to another polarity, which leads to inconsistency in brightness before and after inversion. Thus, the human eyes will see a significant flicker phenomenon.

In order to solve the abovementioned technical problems, the following technical solutions have been proposed.

Figure 2:
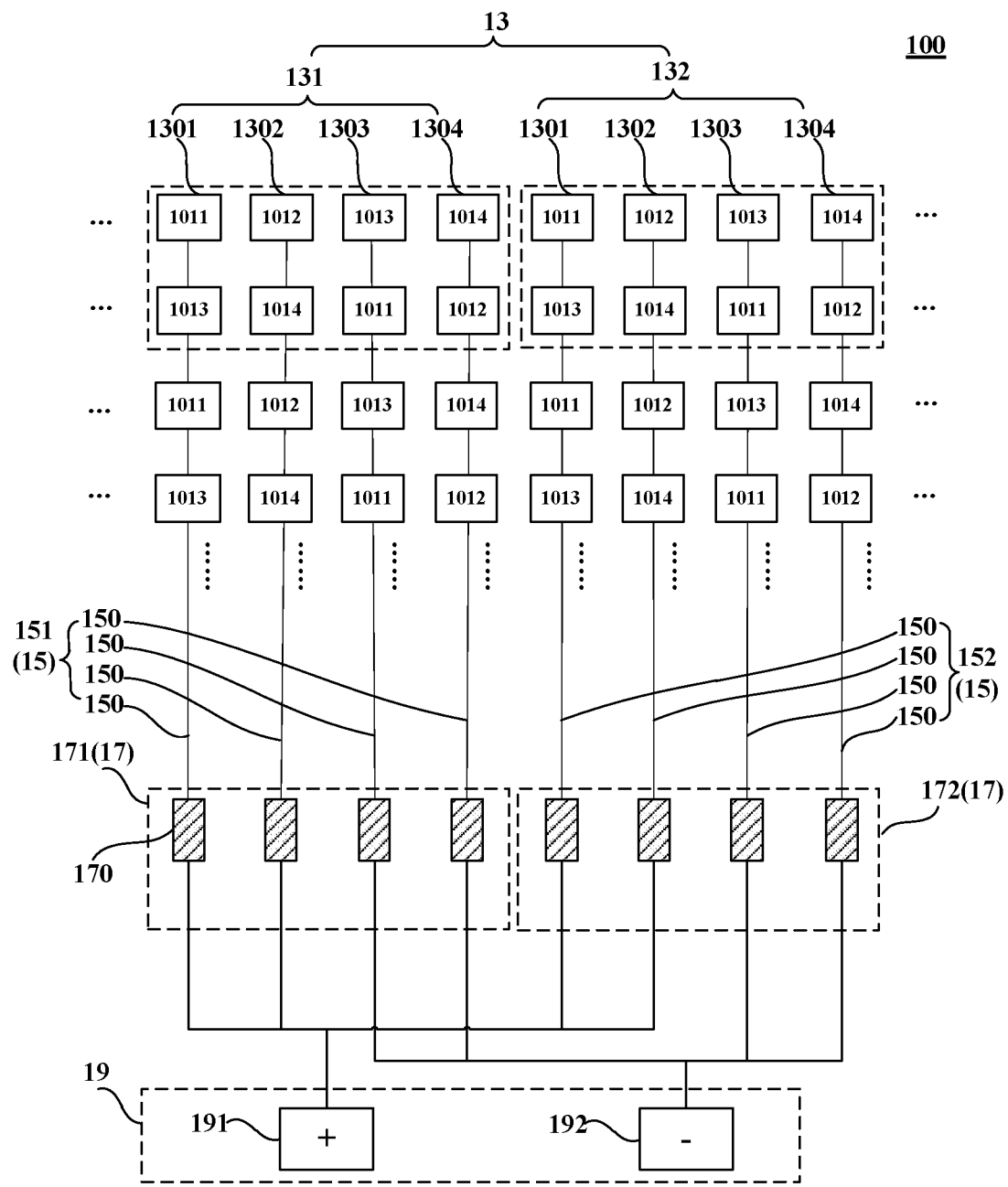
FIG. 2 is a top view of a structural schematic diagram of a display panel according to an embodiment of the present disclosure.

The present disclosure provides a display panel. As shown in FIG. 2, FIG. 2 is another structural schematic diagram of a display panel according to an embodiment of the present disclosure, the display panel 100 includes a first color pixel 1011, a second color pixel 1012, a third color pixel 1013 and a fourth color pixel 1014. There are various arrangement manners of the four color pixels in the embodiments, and for ease of describing the present solution, FIG. 2 exemplarily shows one arrangement manner.

With further reference to FIG. 2, the display panel 100 further includes N pixel column unit groups 13. Each pixel column unit group 13 includes a first pixel column unit 131 and a second pixel column unit 132. The first pixel column unit 131 and the second pixel column unit 132 each includes a first column of pixels 1301, a second column of pixels 1302, a third column of pixels 1303, and a fourth column of pixels 1304. Color(s) of pixel(s) included in the first column of pixels 1301 is/are the same as color(s) of pixel(s) included in the third column of pixels 1303. It should be understood that both the first column of pixels 1301 and the third column of pixels 1303 are composed of pixel(s) having a same color. Alternatively, both the first column of pixels 1301 and the third column of pixels 1303 include pixels having more than one colors, and the pixels included in the first column of pixels 1301 and the pixels included in the third column of pixels 1303 correspond to the same colors. For example, as shown in FIG. 2, both the first column of pixels 1301 and the third column of pixels 1303 include pixels having two colors. Similarly, Color(s) of pixel(s) included in the second column of pixels 1302 is/are the same as color(s) of pixel(s) included in the fourth column of pixels 1304, and for understanding of the second column of pixels 1302 and the fourth column of pixels 1304, reference can be made to the first column of pixels 1301 and the third column of pixels 1303, which will not be further described herein.

With further reference to FIG. 2, the display panel 100 further includes N data line unit groups 15 one-to-one corresponding to the N pixel column unit groups 13. Each of the N data line unit groups 15 includes a first data line unit 151 and a second data line unit 152. Each of the first data line unit 151 and the second data line unit 152 includes four data lines 150. The four data lines 150 in the first data line unit 151 are electrically connected to the four pixel columns in the first pixel column unit 131 in one-to-one correspondence. The four data lines 150 in the second data line unit 152 are electrically connected to the four pixel columns in the second pixel column unit 132 in one-to-one correspondence.

The display panel 100 further includes N driving unit groups 17 one-to-one corresponding to the N data line unit groups 15. Each of the N driving unit groups 17 includes a first driving unit 171 and a second driving unit 172. Each of the first driving unit 171 and the second driving unit 172 includes four switch element groups 170. First terminals of the four switch element groups 170 in the first driving unit 171 are electrically connected to the four data lines 150 in the first data line unit 151 in one-to-one correspondence. First terminals of the four switch element groups 170 in the second driving unit 172 are electrically connected to the four data lines 150 in the second data line unit 152 in one-to-one correspondence.

The display panel 100 further includes N data output groups 19 corresponding to the N driving unit groups 17. Each of the N data output groups 19 includes a first data output 191 and a second data output 192. A polarity of a data signal output from the first data output 191 is opposite to a polarity of a data signal output from the second data output 192.

It should be noted that, for example, as shown in FIG. 2, the polarity of the data signal output from the first data output 191 is positive, and the polarity of the data signal output from the second data output 192 is negative. Alternatively, the polarity of the data signal output from the first data output 191 is negative, and the polarity of the data signal output from the second data output 192 is positive. This embodiment does not limit the polarities of the data signals output from the above two data outputs as long as the polarity of the data signal output from the first data output is opposite to the polarity of the data signal output from the second data output.

As shown in FIG. 2, the second terminals of two of the four switch element groups 170 in the first driving unit 171 are electrically connected to the first data output 191, and two pixel columns corresponding to the two switch element groups 170 connected to the first data output 191 have pixels of different colors. The second terminals of the other two of the four switch element groups 170 in the first driving unit 171 are electrically connected to the second data output 192, and the two pixel columns corresponding to the other two switch element groups 170 connected to the second data output 192 have pixels of different colors. The second terminals of two of the four switch element groups 170 in the second driving unit 172 are electrically connected to the first data output 191, and two pixel columns corresponding to the two switch element groups 170 connected to the first data output 191 have pixels of different colors. The second terminals of the other two of the four switch element groups 170 in the second driving unit 172 are electrically connected to the second data output 192, and the other two pixel columns corresponding to the two switch element groups 170 connected to the second data output 192 have pixels of different colors, wherein N is a positive integer.

The polarity of the data signal involved in the embodiments will be briefly described in the following.

When the display panel performs displaying, the deflection of the liquid crystal molecules is determined by the common voltage signal received by the common electrode and the data signal received by the pixel electrode. Moreover, since the common electrode generally receives a constant electrical signal (for example, a voltage value of the constant electrical signal is a), it should be understood that, when voltage value b of the data signal received by the pixel electrode is larger than the voltage value a of the electrical signal received by the common electrode, it indicates that the polarity of the data signal is positive, that is, the polarity of the data signal received by the corresponding pixel is positive. Otherwise, the polarity of the data signal is negative, and the polarity of the data signal received by the corresponding pixel is negative. It should be noted that for the display of a solid color image, for example, when a red image is displayed, the polarity of the data signal received by some red pixels may be positive, and the polarity of the data signal received by other red pixels may be negative. At this time, |b−a| has a constant value, thereby allowing the same amount of light-transmission from the liquid crystal molecules, which can achieve stability of the display screen. For example, if a=5V, some red pixels receive a data signal b=0V, and some other red pixels receive a data signal b=10V. At this time, the deflection angles of the liquid crystal molecules have a same value, and the difference lies in that some liquid crystal molecules are deflected clockwise, and some other liquid crystal molecules are deflected counterclockwise. Since the deflection angles of the liquid crystal molecules have a certain value, the light-transmittance amounts from the backlight have a certain value, and thus the image displaying effect will not be influenced.

It should be understood that the clockwise deflection of the liquid crystal molecules corresponds to the positive polarity, and the counterclockwise deflection of the liquid crystal molecules corresponds to the negative polarity. That is, in the process of displaying a solid color image, pixels having a same color are divided into two parts, the polarity of the data signal received by one of the two parts is positive, and the polarity of the data signal received by the other one of the two parts is negative. In this case, during a period from a first period of polarity inversion to a second period of polarity inversion, the polarity of the data signal received by some pixels is positive while the polarity of the data signal received by other pixels having this color is negative, thereby avoiding a flickering phenomenon caused by significant non-uniform brightness due to all pixels having a same color changing from one polarity to another polarity for the entire image, which can improve the display quality. Although polarities are different, liquid crystal has a same deflection angle, and thus will not influence the display effect.

It should be noted that the "first period of polarity inversion" can be understood as a frame time, and the "second period of polarity inversion" can also be understood as a frame time, and then "from the first period of polarity inversion to the second period of polarity inversion" can be understood as "from the current frame to the next frame". The polarity of the data signal output from the first data output in the current frame is opposite to the polarity of the data signal output from the first data output in the next frame. Similarly, the polarity of the data signal output from the second data output in the current frame is also opposite to the polarity of the data signal output from the second data output in the next frame.

Figure 3:
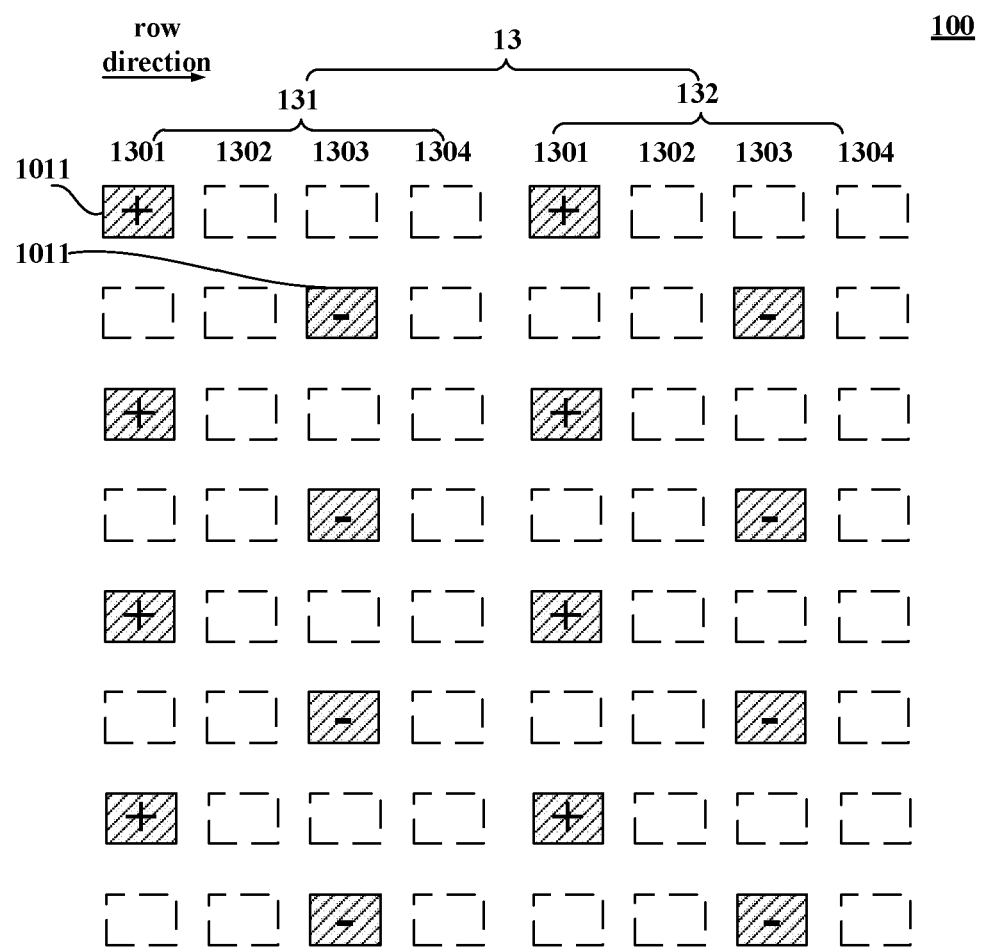
FIG. 3 is still a top view of another structural schematic diagram of a display panel according to an embodiment of the present disclosure.

In this embodiment, when the display panel 100 displays a solid color image, assuming that the first color pixel 1011 is a red pixel, in combination with the arrangement manner shown in FIG. 2, a polarity of a data signal provided to each red pixel when a red image is displayed is as shown in FIG. 3. FIG. 3 is still another structural schematic diagram of a display panel according to an embodiment of the present disclosure. Within a pixel column unit group 13, two red pixel columns (the first column of pixels 1301 and the third column of pixels 1303) in the first pixel column unit 131 receive data signals with opposite polarities, that is, the polarity of the data signal received by the first column of pixels 1301 is positive, and the polarity of the data signal received by the third column of pixels 1303 is negative.

The polarity inversion process according to this embodiment will be exemplified by using a polarity inversion cycle as one frame.

In the current frame, some red pixels receive a data signal having a positive polarity, and other red pixels receive a data signal having a negative polarity. In a next frame, some red pixels that have received the data signal having the positive polarity receive the data signal having a negative polarity, and the other red pixels that have received the data signal having the negative polarity receive the data signal having a positive polarity. That is, from the current frame to the next frame (switching between two adjacent frames), the data signal received by some red pixels changes from a first signal (which can be understood as the polarity of the data signal is positive) to a second signal (the polarity of the data signal is negative), and the data signal received by the other red pixels changes from the second signal (the polarity of the data signal is negative) to the first signal (the polarity of the data signal is positive). In other words, in each frame, the polarity of the data signal received by some of pixels of a same color is positive, and the polarity of the data signal received by some of the pixels of the same color is negative. Therefore, compared with the related art, this embodiment can avoid the flickering phenomenon caused by significant non-uniform brightness due to all pixels having a same color changing from one polarity to another polarity for the entire image while switching between two adjacent frames of images, thereby improving the display quality.

It should be noted that the first data output 191 and the second data output 192 included in the data output group 19 involved in this embodiment are both driven by a driving chip. That is, the data signals received by the pixels are provided by the driving chip.

According to the structure of the display panel shown in FIG. 2, this embodiment provides a driving method for a display panel, and the driving method for the display panel is applicable to the abovementioned display panel 100.

Figure 4:
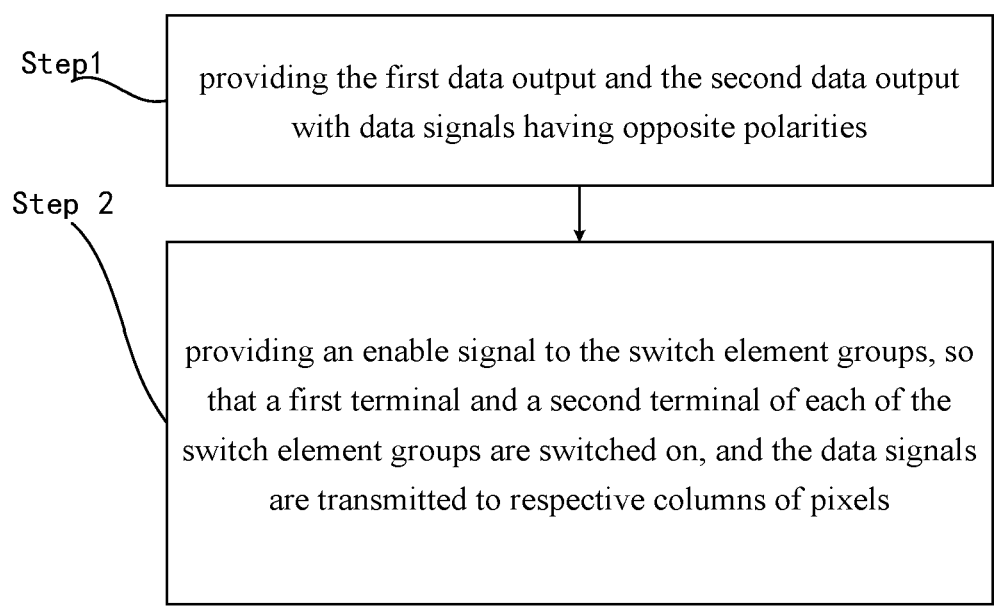
FIG. 4 is a flowchart of a driving method for a display panel according to an embodiment of the present disclosure

As shown in FIG. 4, FIG. 4 is a flowchart of a driving method for a display panel according to an embodiment of the present disclosure, and the driving method for the display panel includes the following steps.

At step 1, the first data output and the second data output are provided with data signals having opposite polarities.

At step 2, an enable signal is provided to the switch element groups, so that the first and second terminals of each switch element group are switched on and the data signals are transmitted to respective columns of pixels.

The driving method for the display panel will be described by taking the first color pixel 1011 shown in FIG. 2 as an example.

In the current frame, the polarity of the data signal output from the first data output 191 is positive, and the polarity of the data signal output from the second data output is negative. At this time, in the first pixel column unit 131, the first column of pixels 1301 and the second column of pixels 1302 respectively electrically connected to the first data output 191 receive a data signal having a positive polarity, that is, the polarity of the data signal received by the first color pixel 1011 disposed in the first column of pixels 1301 is positive. The third column of pixels 1303 and the fourth column of pixels 1304 respectively electrically connected to the second data output 192 receives a data signal having a negative polarity, that is, the polarity of the data signal received by the first color pixel 1011 disposed in the third column of pixels 1303 is negative. Similarly, in the second pixel column unit 132, the first column of pixels 1301 and the second column of pixels 1302 respectively electrically connected to the first data output 191 receives a data signal having a positive polarity, that is, the polarity of the data signal received by the first color pixel 1011 disposed in the first column of pixels 1301 is positive. The third column of pixels 1303 and the fourth column of pixels 1304 respectively electrically connected to the second data output 192 receives a data signal having a negative polarity, that is, the polarity of the data signal received by the first color pixel 1011 disposed in the third column of pixels 1303 is negative. That is, in the current frame, the polarity of the data signal received by some first color pixels 1011 is positive, and the polarity of the data signal received by some other first color pixels 1011 is negative.

In a next frame, the polarity of the data signal output from the first data output 191 becomes negative, and the polarity of the data signal output from the second data output 192 becomes positive. At this time, in the first pixel column unit 131, the first column of pixels 1301 and the second column of pixels 1302 respectively electrically connected to the first data output 191 receives a data signal having a negative polarity, that is, the polarity of the data signal received by the first color pixel 1011 disposed in the first column of pixels 1301 is negative. The third column of pixels 1303 and the fourth column of pixels 1304 respectively electrically connected to the second data output 192 receives a data signal having a positive polarity, that is, the polarity of the data signal received by the first color pixel 1011 disposed in the third column of pixels 1303 is positive. Similarly, in the second pixel column unit 132, the first column of pixels 1301 and the second column of pixels 1302 respectively electrically connected to the first data output 191 receives a data signal having a negative polarity, that is, the polarity of the data signal received by the first color pixel 1011 disposed in the first column of pixels 1301 is negative. The third column of pixels 1303 and the fourth column of pixels 1304 respectively electrically connected to the second data output 192 receives a data signal having a positive polarity, that is, the polarity of the data signal received by the first color pixel 1011 disposed in the third column of pixels 1303 is positive. That is, in the next frame, the polarity of the data signal received by some first color pixels 1011 is positive, and the polarity of the data signal received by some other first color pixels 1011 is negative. Therefore, during the display process from the current frame to the next frame, the polarity of some received data signals changes from positive to negative, and the polarity of some other received data signals changes from negative to positive, so as to avoid the flickering phenomenon caused by significant non-uniform brightness due to all pixels having a same color changing from one polarity to another polarity for the entire image while switching between two adjacent frames of images.

Figure 5:
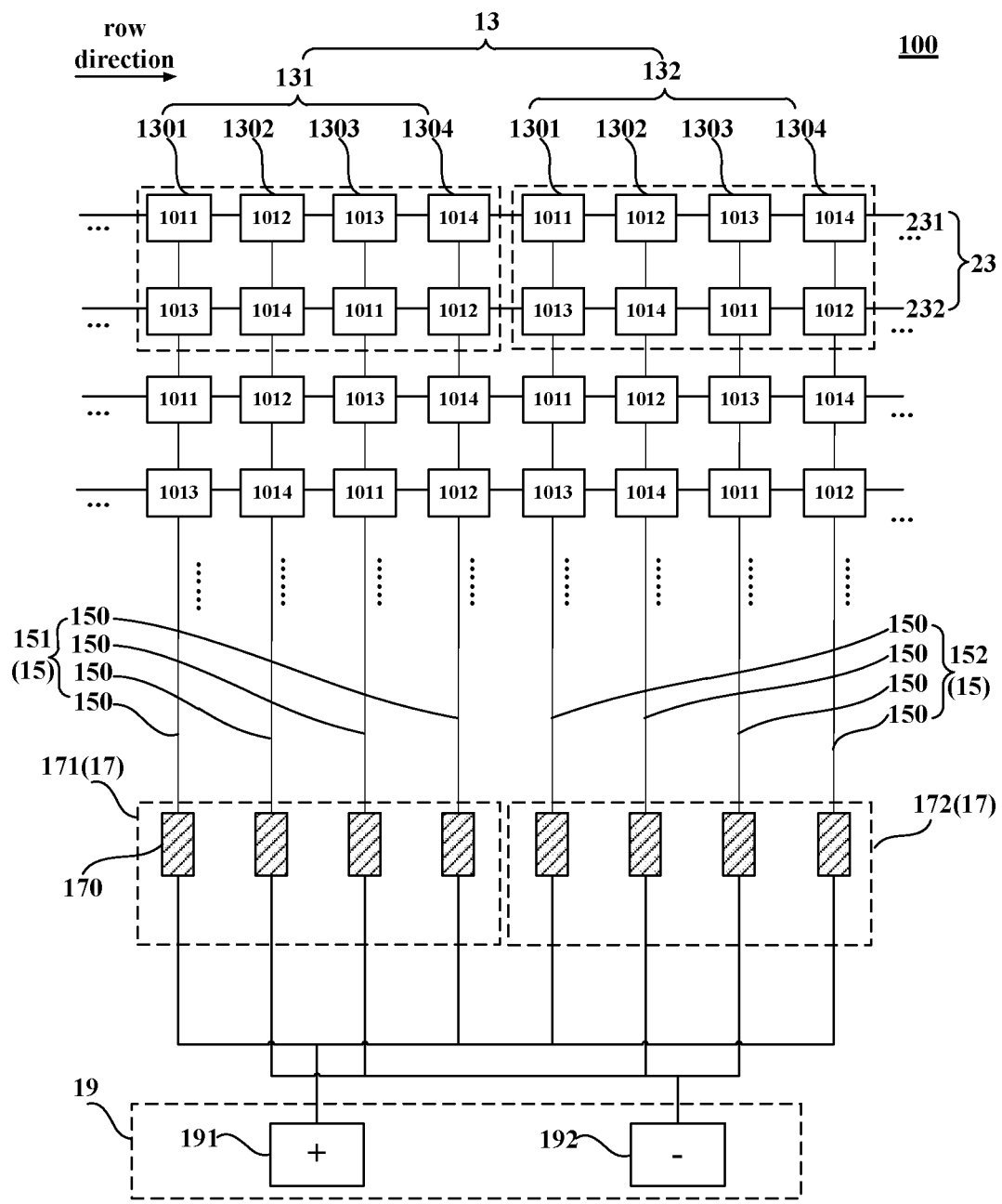
FIG. 5 is still a top view of another structural schematic diagram of a display panel according to an embodiment of the present disclosure.

Further, as shown in FIG. 5, FIG. 5 is still another structural schematic diagram of a display panel according to an embodiment of the present disclosure. In this embodiment, the first pixel column unit 131 and the second pixel column unit 132 within each pixel column unit group 13 are spaced from each other along a row direction, and pixels having a same color in a same row receive data signals having a same polarity. Taking the arrangement of pixels shown in FIG. 5 as an example and still taking the first color pixel 1011 as an example, the polarity of the data signal received by the first color pixels 1011 in the first row is positive, and the polarity of the data signal received by the first color pixels 1011 in the second row is negative. The polarities of the received data signals are arranged alternately along the row direction so that the polarities are arranged evenly, which can further alleviate the flickering of the entire screen during the polarity inversion process, thereby improving the display effect of the display panel.

In order to further alleviate the flickering and improve the display quality, in this embodiment, the number of data signals having a positive polarity received by pixels having a same color is the same as the number of data signals having a positive polarity received by the pixels having the same color.

In addition, when the display panel displays a partial solid color image, in which only pixels corresponding to a single color are illumined, since polarities of data signals received by two pixel columns in which pixels having a same color in each pixel column unit are located are different, as shown in FIG. 5, taking the first color pixel 1011 in the pixel column unit 131 as an example, the polarity of the data signal received by the first column of pixels 1301 is opposite to the polarity of the data signal received by the third column of pixels 1303. This can also avoid the flickering phenomenon caused during the polarity inversion process.

Further, taking the arrangement of pixels shown in FIG. 5 as an example, polarities of data signals of pixels in each pixel column are exemplarily shown. The colors of pixels included in the first column of pixels 1301 are the same as the colors of pixels included in the third column of pixels 1303, and the colors of pixels included in the second column of pixels 1302 are the same as the colors of pixels included in the fourth column of pixels 1304. In a same driving unit, pixels in the two pixel columns corresponding to the two switch element groups 170 connected to the first data output 191 have different colors. Therefore, there are two connection manners between the driving unit and the pixel column unit group as follows.

In a first connection manner, as shown in FIG. 2, the data line 150 electrically connected to the first column of pixels 1301 and the data line 150 electrically connected to the second column of pixels 1302 in the first data line unit 151 are electrically connected to the first data output 191 through respective switch element groups 170, and the data line electrically connected to the third column of pixels 1303 and the data line electrically connected to the fourth column of pixels 1304 in the first data line unit 151 are electrically connected to the second data output 192 through respective switch element groups 170.

In one pixel column unit, polarities of data signals received by different pixel columns corresponding to a same color pixel are opposite to each other. Taking the first color pixels 1011 in the first pixel column unit 131 shown in FIG. 2 as an example, the polarity of the data signal received by the first column of pixels 1301 is positive, and the polarity of the data signal received by the third column of pixels 1303 is negative. Therefore, during a frame inversion of a partial solid color image, in which only pixels corresponding to a single color are illumined, it is possible that the polarity of the data signal received by some pixels having a same color changes from positive to negative, and the polarity of the data signal received by some other pixels having the same color changes from negative to positive, thereby avoiding the flickering phenomenon.

In a second connection manner, as shown in FIG. 5, the data line electrically connected to the first column of pixels 1301 and the data line electrically connected to the fourth column of pixels 1304 in the first data line unit 151 are electrically connected to the first data output 191 through respective switch element groups 170, the data line electrically connected to the second column of pixels 1302 and the data line electrically connected to the third column of pixels 1303 in the first data line unit 151 are electrically connected to the second data output 192 through respective switch element groups 170. When switching between two adjacent frames of the display panel in this embodiment, the polarity of the data signal received by some pixels having a same color changes from positive to negative, and the polarity of the data signal received by some other pixels having the same color changes from negative to positive, thereby effectively avoiding the flickering phenomenon and thus improving the display effect. In addition, the positive and negative polarities of the data signals received by pixel electrodes having a same color are uniformly arranged in the row direction and the column direction, thereby further alleviating the flickering and thus improving the display quality.

Figure 6:
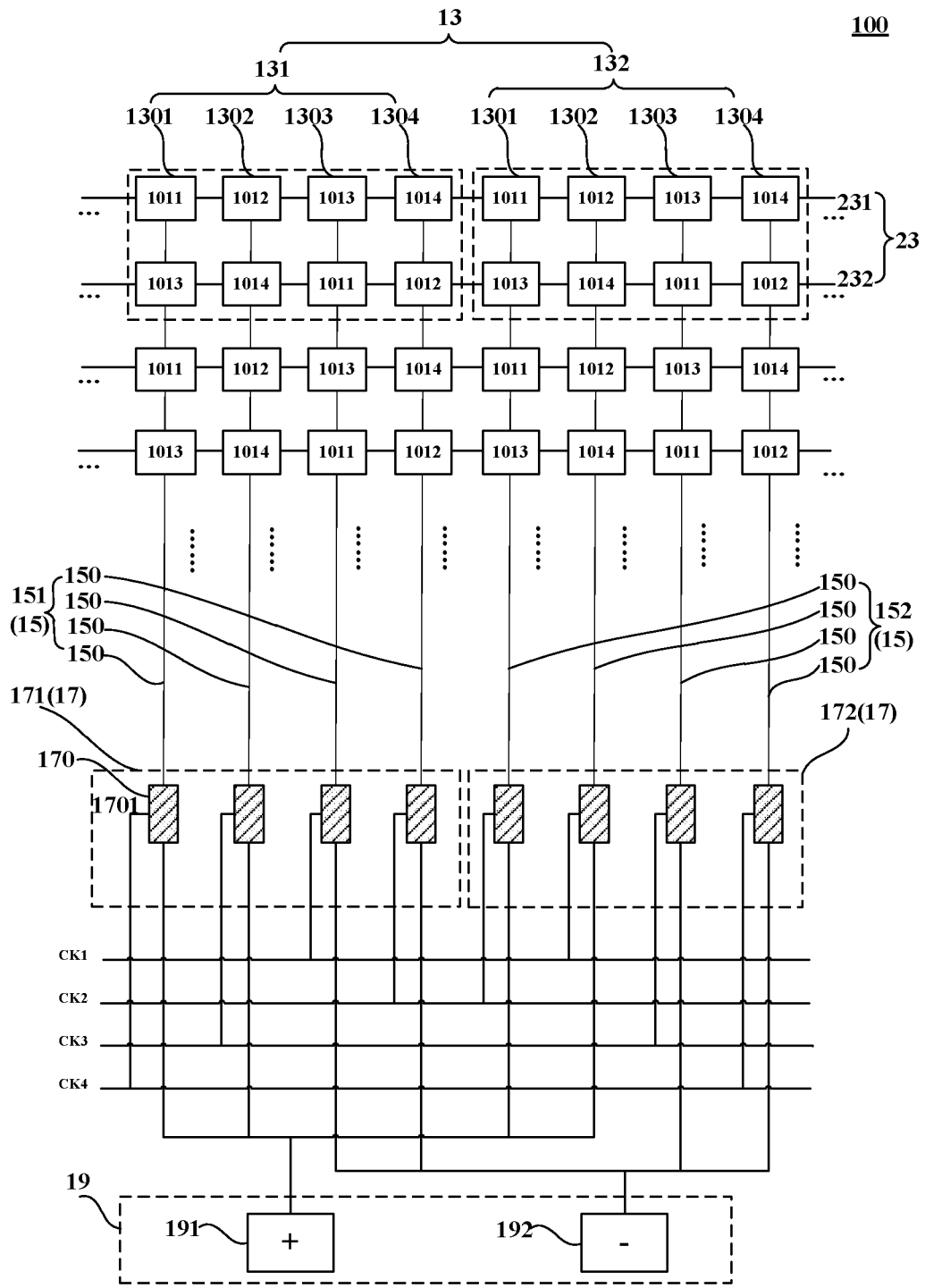
FIG. 6 is still a top view of another structural schematic diagram of a display panel according to an embodiment of the present disclosure.

Based on the abovementioned two connection manners, in an embodiment, the display panel further includes four clock signal line groups. There are various connection manners between the four signal line groups and the data line unit groups. For example, as shown in FIG. 6, which is still another structural diagram of a display panel according to an embodiment of the present disclosure, the display panel 100 in this embodiment further includes four clock signal line groups, including a first clock signal line group CK1, a second clock signal line group CK2, a third clock signal line group CK3, and a fourth clock signal line group CK4. Control terminals 1701 of four switch element groups electrically connected to the first data output 191 are electrically connected to the four clock signal line groups in one-to-one correspondence, and control terminals 1701 of four switch element groups electrically connected to the second data output 192 are also electrically connected to the four clock signal line groups in one-to-one correspondence. In the process of charging pixels in a same row, after the four clock signal lines are sequentially turned on, the four switch element groups 170 electrically connected to the first data output 191 transmit data signals to the corresponding four pixel columns, and the four switch element groups 170 electrically connected to the second data output 192 transmit data signals to the corresponding four pixel columns, thereby completing the charging for the first pixel column unit 131 and the second pixel column unit 132 included in one pixel column unit group 13. Although each row contains N pixel column unit groups, the connection manner in each pixel column unit group is the same. Therefore, only four clock signal line groups are needed to complete the charging process for a row of pixels, thereby saving charging time for pixels in a same row.

Further, in an embodiment, with reference to FIG. 6, FIG. 8, FIG. 9 and FIG. 10, FIGS. 8-10 of which each is another structural schematic diagram of a display panel according to an embodiment of the present disclosure, the control terminals 1701 of the four switch element groups 170 corresponding to the four data lines 150 in the first data line unit 151 are electrically connected to the four clock signal line groups in one-to-one correspondence, and the control terminals 1701 of the four switch element groups 170 corresponding to the four data lines 150 in the second data line unit 152 are electrically connected to the four clock signal line groups in one-to-one correspondence.

The driving method will be described in the following by taking the structure of the display panel and the first color pixels 1011 shown in FIG. 6 as an example.

Figure 7:
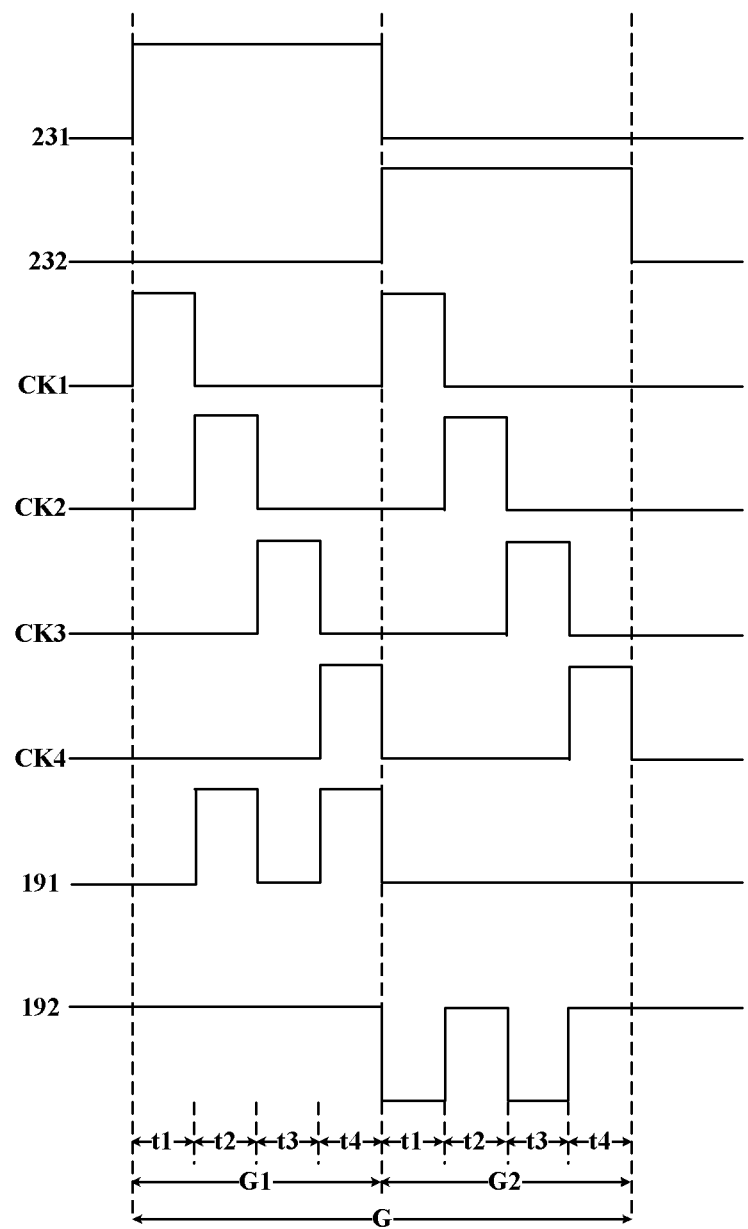
FIG. 7 is a time sequence of signals driving a display panel according to an embodiment of the present disclosure.

As shown in FIG. 7, FIG. 7 is a sequence diagram of a display panel according to an embodiment of the present disclosure, and in particular a sequence diagram for the first color pixels 1011 shown in FIG. 6 receiving data signals. In combination with the structure of the display panel as shown in FIG. 6, the display panel 100 further includes a plurality of gate lines 23, and each of the plurality of gate lines 23 is electrically connected to a respective one row of pixels. For example, a first row of pixels corresponds to a first gate line 231, and a second row of pixels corresponds to a second gate line 232. In this embodiment, the scanning time for every two adjacent gate lines 23 is one cycle G. The scanning time for a previous gate line is a first sub-cycle G1, and the scanning time for the remaining one gate line is a second sub-cycle G2. The first sub-cycle G1 and the second sub-cycle G2 each includes four time periods, namely t1, t2, t3, and t4.

The driving method for the display panel includes the following steps.

During the first sub-cycle G1, a data signal is provided to the first data output 191, and an enable signal is provided to each of the four clock signal line groups.

During the second sub-cycle G2, a data signal is provided to the second data output 192, and an enable signal is provided to each of the four clock signal line groups.

The abovementioned driving method will be explained in the following.

During the first sub-cycle G1, that is, during scanning the first gate line 231, in the first time period t1, the first clock signal line group CK1 provides an enable signal to a switch element group 170 corresponding to the third column of pixels 1303 in the first pixel column unit 131, so that first and second terminals of the switch element group 170 are switched on. However, at this moment, since the second data output 192 is not turned on, there is no corresponding signal transmitted to the third color pixel 1013 in the first pixel column unit 131. Meanwhile, the first clock signal line group CK1 provides an enable signal to a switch element group 170 corresponding to the second column of pixels 1302 in the second pixel column unit 132, so that first and second terminals of the switch element group 170 are switched on. At this time, since the first data output terminal 191 is not turned on, there is no corresponding data signal transmitted to the second color pixel 1012 in the second pixel column unit 132. In the second period t2, the second clock signal line group CK2 is turned on, and the switch element groups 170 electrically connected to the second clock signal line group CK2 are turned on. At this moment, since the second data output 192 is not turned on, there is no corresponding signal transmitted to the fourth color pixel 1014 in the first pixel column unit 131. At this moment, the first data output 191 is turned on, so the data signal with positive polarity can be transmitted to the corresponding first color pixels 1011 in the second pixel column unit 132. The transmission process of the data signal is similar in the third period t3 and the fourth period t4 and the second sub-cycle G2, and will not be further described herein.

In this embodiment, based on the abovementioned manner, in the current frame, the polarity of the data signal received by some first color pixels 1011 is positive, and polarity of the data signal received by some other first color pixels 1011 is negative. In the next frame, a scanning is performed on each row of gate lines based on the abovementioned manner, except that the polarity of the data signal output from the first data output 191 to the corresponding pixels is negative, and the polarity of the data signal output from the second data output 192 to the corresponding pixels is positive. Still taking the first color pixels 1011 as an example, the polarity of the data signal received by some first color pixels 1011 changes from positive to negative, and the polarity of the data signal received by some other first color pixels 1011 changes from negative to positive, so that when switching between two adjacent frames, the polarity of the data signal received by some pixels having a same color changes from positive to negative, and the polarity of the data signal received by some other pixels having the same color changes from negative to positive, thereby effectively alleviating the flickering phenomenon and thus improving the display effect.

In addition, in this embodiment, data lines connected to pixels having a same color in a same row are connected to different clock signal line groups. In view of this, when the display panel displays a solid color image, switching on is implemented in time division so that pixels having a same color are charged in time division, thus avoiding the mutual interference caused by the simultaneous charging of pixels having a same color and thus improving the display effect.

Figure 8:
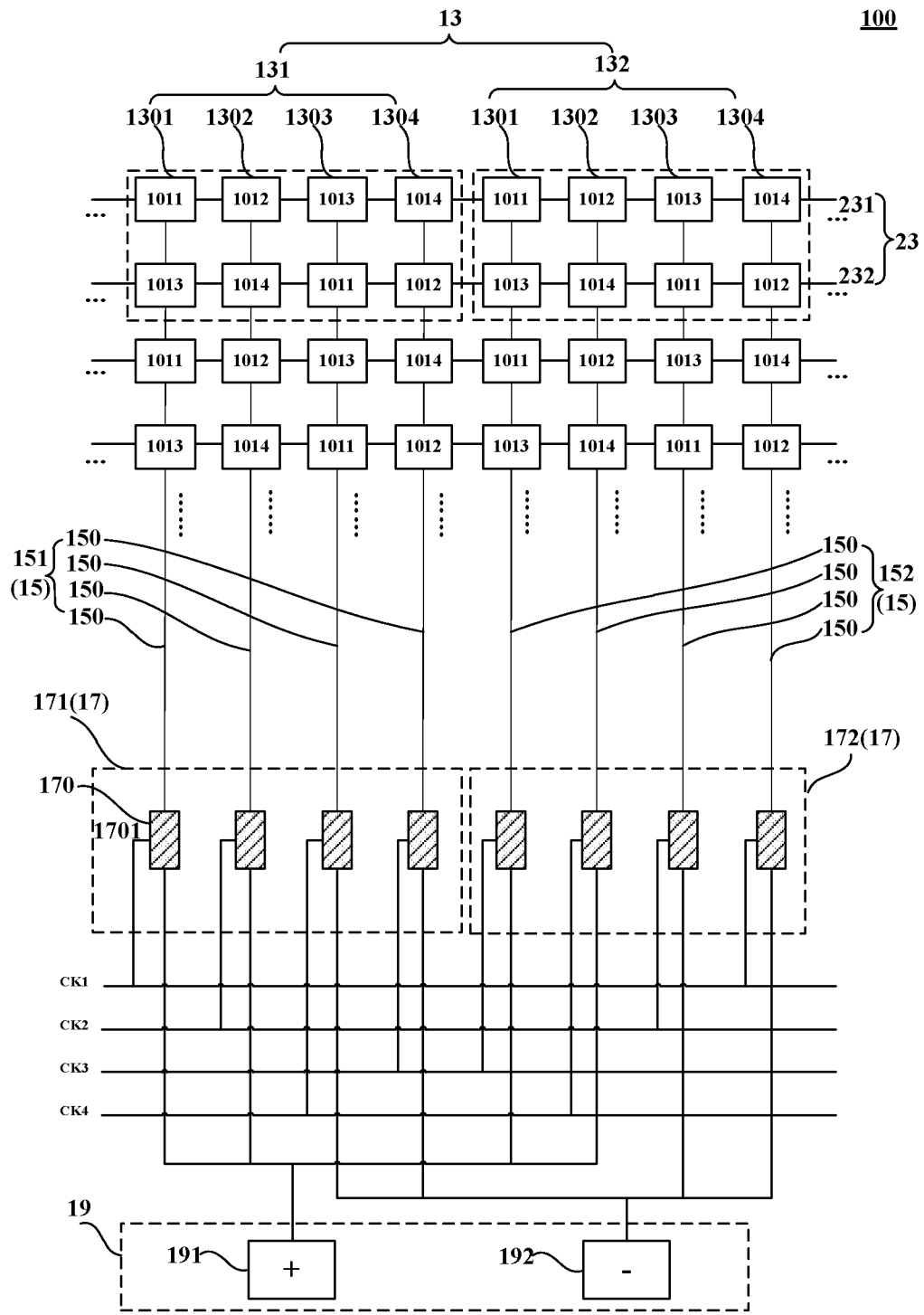
FIG. 8 is still a top view of another structural schematic diagram of a display panel according to an embodiment of the present disclosure.
Figure 9:
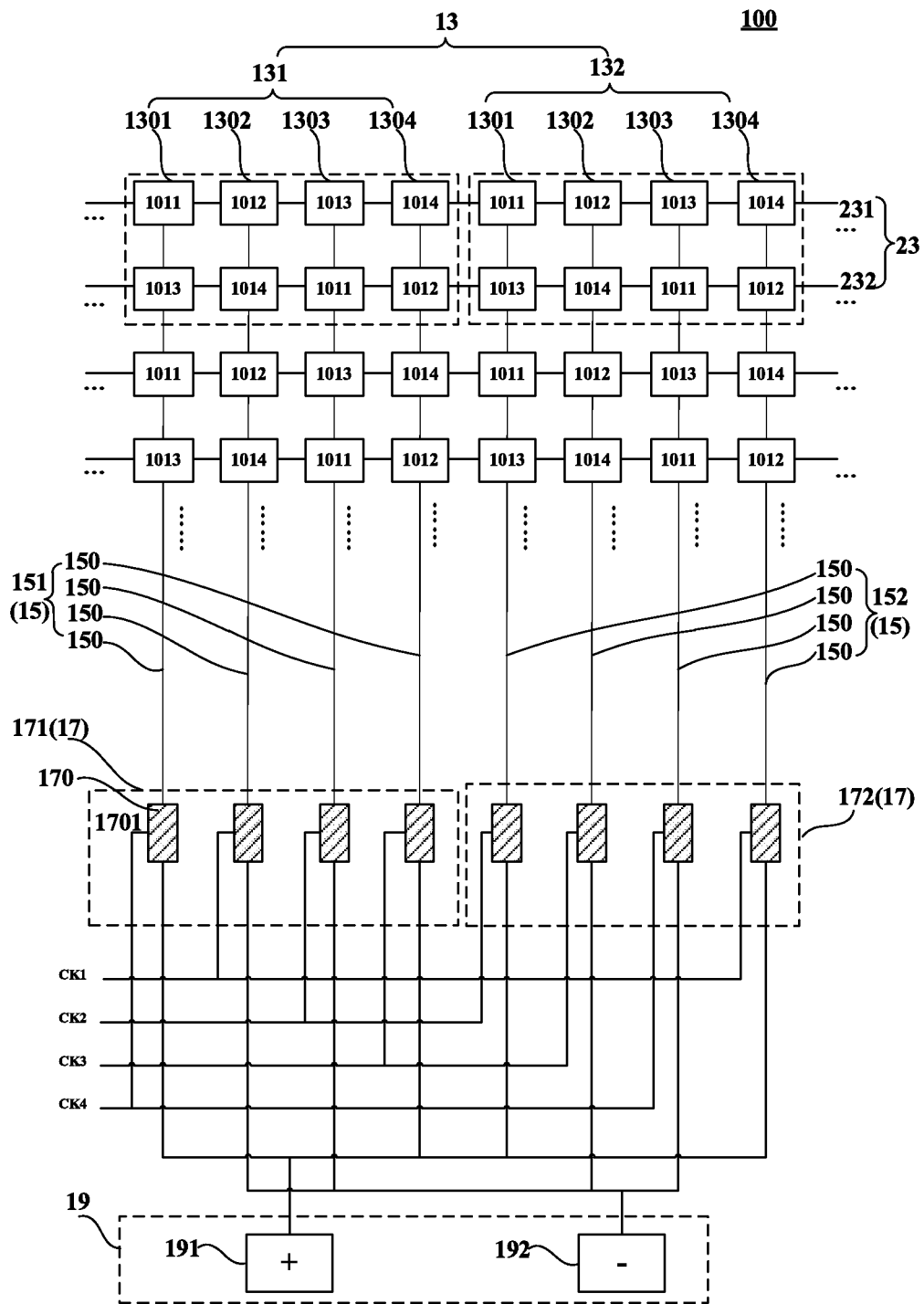
FIG. 9 is still a top view of another structural schematic diagram of a display panel according to an embodiment of the present disclosure.
Figure 10:
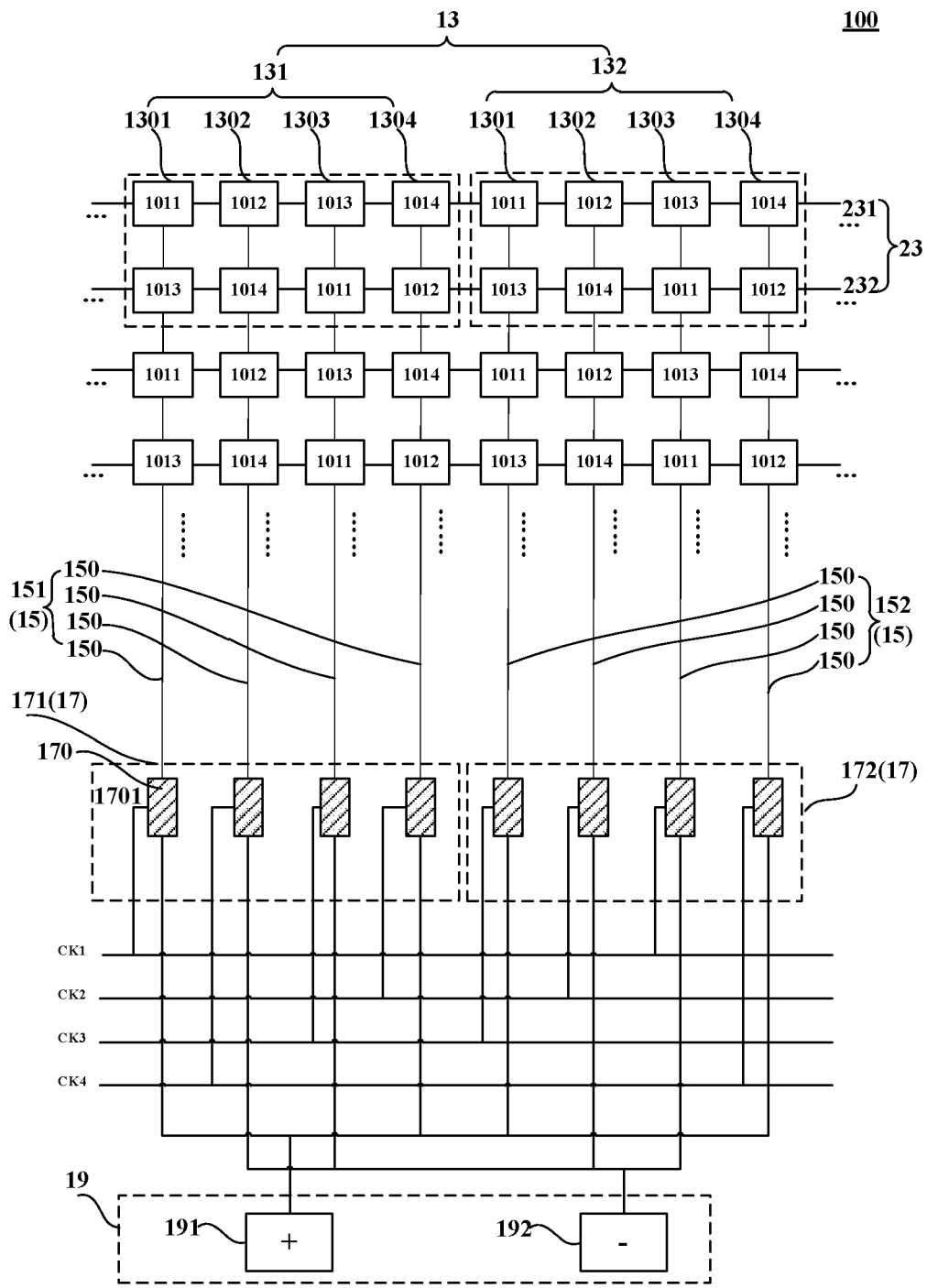
FIG. 10 is still a top view of another structural schematic diagram of a display panel according to an embodiment of the present disclosure.

It should be noted that, for the structure of the display panel shown in FIGS. 8 to 10, a same scanning manner is performed on each row of gate lines, that is, four clock signal line groups are sequentially turned on to complete the scanning of one gate line. The difference lies in that, for a specific color, the corresponding clock signal line group and the corresponding data output are simultaneously turned on to transmit a signal of a corresponding polarity to corresponding pixels. Thus, in the polarity inversion process for pixels having a same color from the current frame to the next frame, the polarity of the data signal received by some pixels having the same color changes from positive to negative, and the polarity of the data signal received by some other pixels having the same color changes from negative to positive, thereby avoiding the flickering phenomenon.

In addition, for the display panel shown in FIGS. 8-10, data lines connected to pixels having a same color in a same row are connected to different clock signal line groups. In view of this, when the display panel displays a solid color image, switching on is implemented in time division so that pixels having a same color are charged in time division, thus avoiding the mutual interference caused by the simultaneous charging of pixels having a same color and thus improving the display effect.

Still further, in one embodiment, in the first sub-cycle, the polarity of the data signal provided to the first data output is positive, and in the second sub-cycle, the polarity of the data signal provided to the second data output is negative.

Alternatively, in the first sub-cycle, the polarity of the data signal provided to the first data output is negative, and in the second sub-cycle, the polarity of the data signal provided to the second data output is positive.

In this embodiment, the first sub-cycle corresponds to a time period of scanning one gate line, and the second sub-cycle corresponds to a time period of scanning another gate line. The time required for scanning all gate lines included in the entire display panel can be understood as one frame of time. Thus, in one frame of time, the polarity of the data signal output from the first data output is opposite to the polarity of the data signal output from the second data output, so as to achieve that within the current frame, the polarity of the data signal received by some pixels having a same color is positive and the polarity of the data signal received by some other pixels having the same color is negative, and further in the next frame, the polarity of the data signal received by some pixels having the same color changes from positive to negative and the polarity of the data signal received by some other pixels having the same color changes from negative to positive, thereby avoiding the flickering phenomenon.

Figure 11:
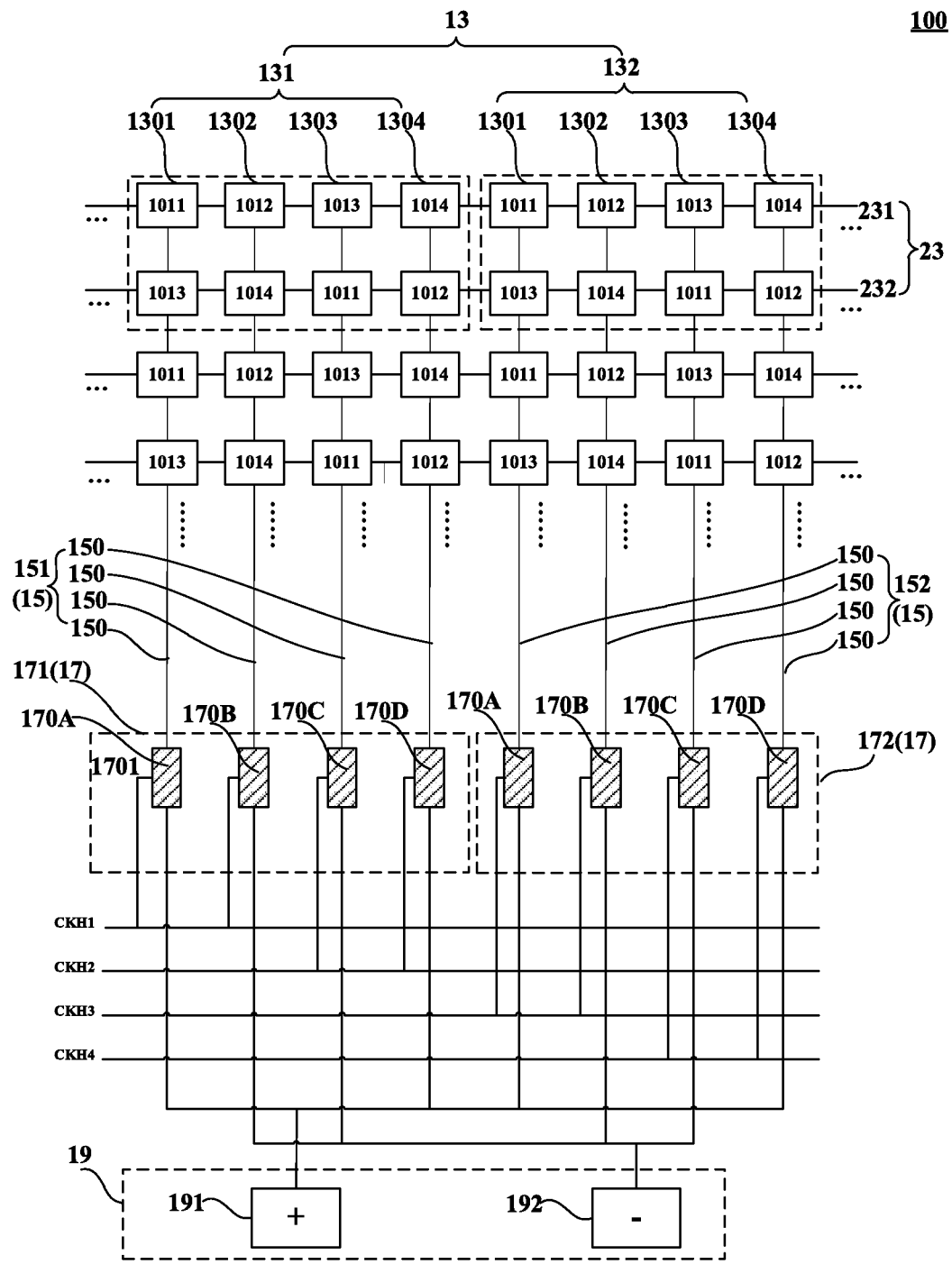
FIG. 11 is still a top view of another structural schematic diagram of a display panel according to an embodiment of the present disclosure.
Figure 13:
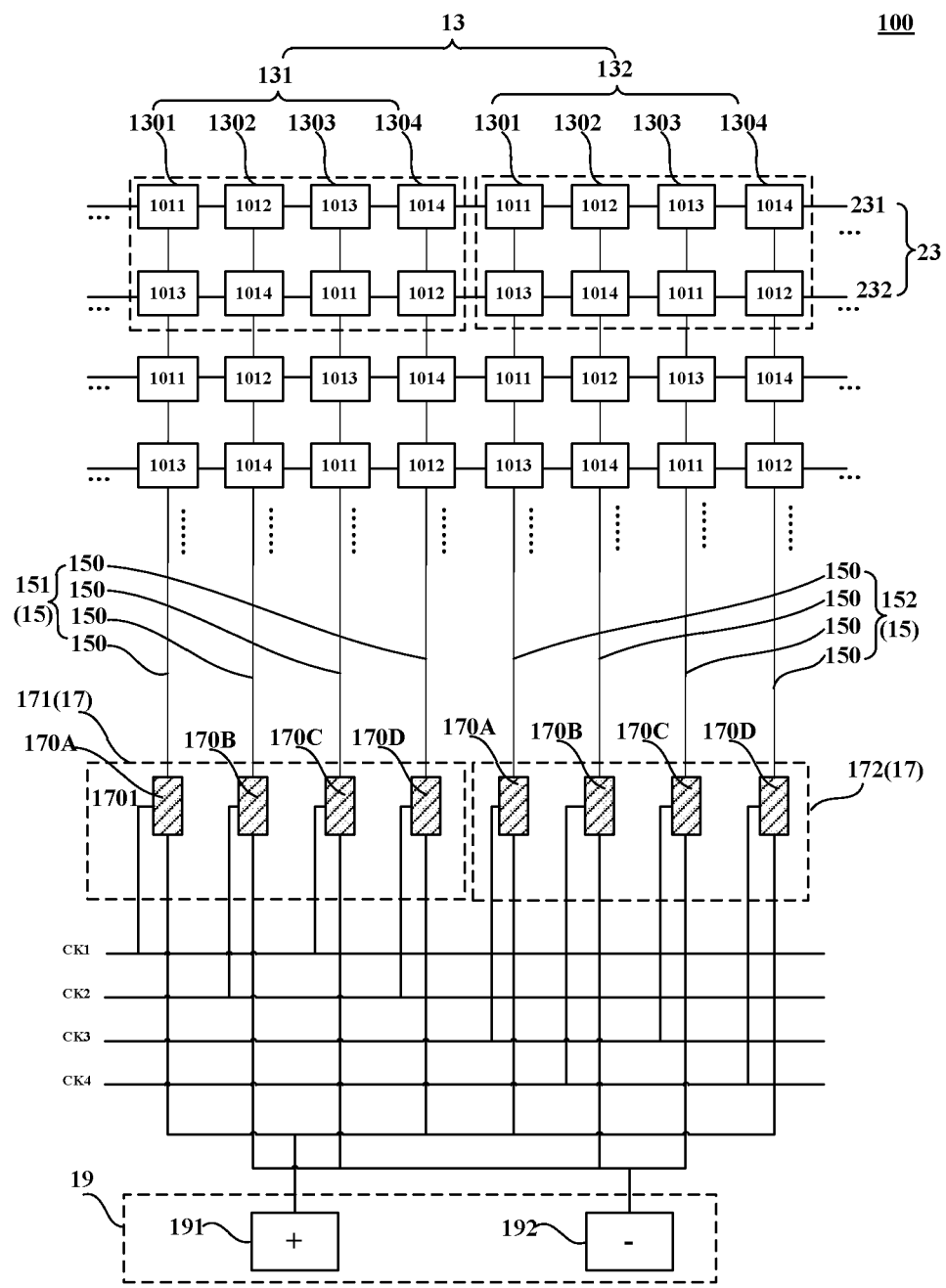
FIG. 13 is still a top view of another structural schematic diagram of a display panel according to an embodiment of the present disclosure.

In another embodiment, as shown in FIG. 11 and FIG. 13, each of which is another structural schematic diagram of a display panel according to an embodiment of the present disclosure. The control terminals 1701 of the four switch element groups 170 corresponding to the four data lines 150 in the first data line unit 151 are electrically connected to two clock signal line groups, and the control terminals 1701 of the four switch element groups 170 corresponding to the four data lines 150 in the second data line unit 152 are electrically connected to the other two clock signal line groups. For ease of description, the four switch element groups in the driving unit are named as a switch element group 170A, a switch element group 170B, a switch element group 170C, and a switch element group 170D.

In the following, the connection manner in this embodiment will be described in detail by taking the display panel shown in FIG. 11 as an example. Among the four switch element groups corresponding to the four data lines 150 in the first data line unit 151, control terminals 1701 of the switch element group 170A and the switch element group 170B are connected to the first clock signal line group CK1, and control terminals 1701 of the switch element group 170C and the switch element group 170D are connected to the second clock signal line group CK2. Among the four switch element groups corresponding to the four data lines 150 in the second data line unit 152, control terminals 1701 of the switch element group 170A and the switch element group 170B are connected to the third clock signal line group CK3, and control terminals 1701 of the switch element group 170C and the switch element group 170D are connected to the fourth clock signal line group CK4.

Taking the structure of the display panel shown in FIG. 11 and the first color pixels 1011 as an example, the driving method will be described in the following.

Figure 12:
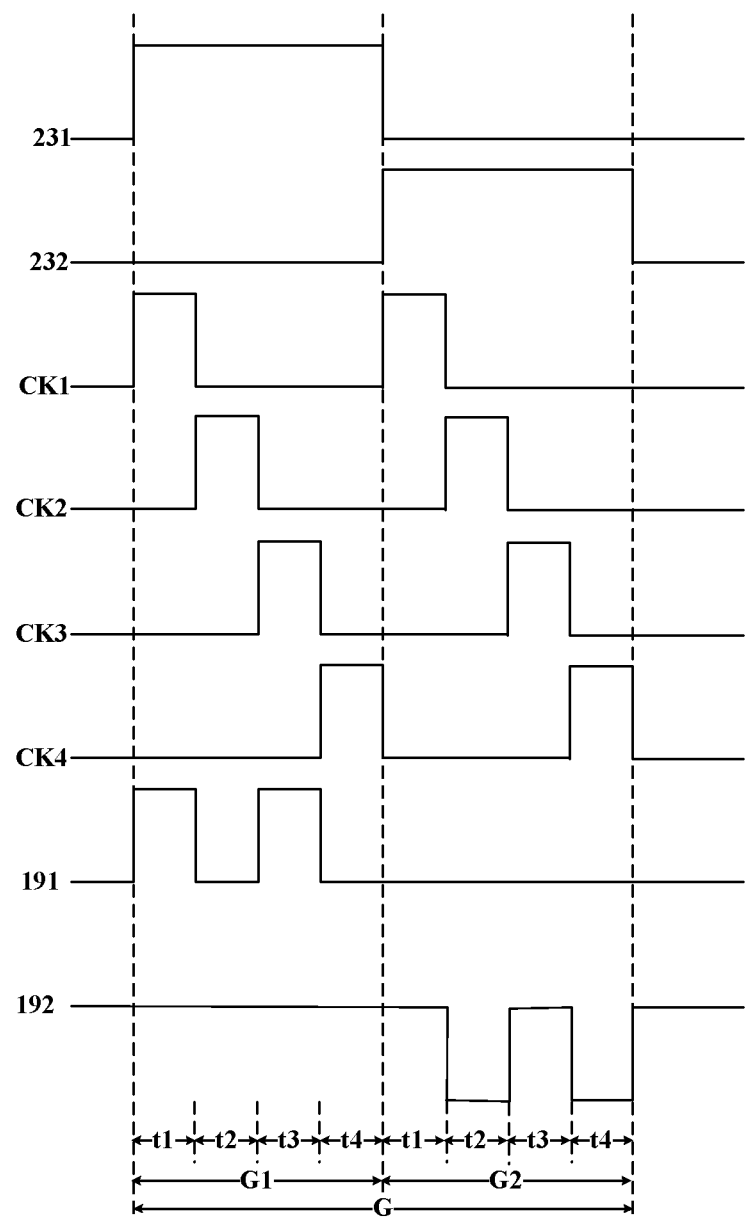
FIG. 12 is another time sequence of signals driving a display panel according to an embodiment of the present disclosure.

As shown in FIG. 12, FIG. 12 is a time sequence of signals driving a display panel according to an embodiment of the present disclosure, and particularly a sequence diagram for the first color pixels 1011 shown in FIG. 11 receiving data signals. In combination with the structure of the display panel as shown in FIG. 11, the display panel 100 further includes a plurality of gate lines 23, and each of the plurality of gate lines 23 is electrically connected to a respective one row of pixels. For example, a first row of pixels corresponds to a first gate line 231, and a second row of pixels corresponds to a second gate line 232. In this embodiment, the scanning time for every two adjacent gate lines 23 is one cycle G. The scanning time for a previous gate line is a first sub-cycle G1, and the scanning time for the remaining one gate line is a second sub-cycle G2. The first sub-cycle G1 and the second sub-cycle G2 each includes four periods, namely t1, t2, t3, and t4.

The driving method for the display panel includes the following steps.

During the first sub-cycle G1, a data signal is provided to the first data output 191, and an enable signal is provided to each of the four clock signal line groups.

During the second sub-cycle G2, a data signal is provided to the second data output, and an enable signal is provided to each of the four clock signal line groups.

The abovementioned driving method will be explained in the following.

During the first sub-cycle G1, that is, during scanning the first gate line 231, in the first period t1, a data signal is provided to the first data output 191. When the first clock signal line group CK1 is turned on, the first clock signal line group CK1 provides an enable signal to the switch element group 170A corresponding to the first column of pixels 1301 in the first pixel column unit 131 and the switch element group 170B corresponding to the second column of pixels 1302 in the first pixel column unit 131, so that first and second terminals of the switch element group 170A and the switch element group 170B are switched on. However, since the switch element group 170A corresponding to the first column of pixels 1301 is electrically connected to the first data output 191, and the second data output 192 electrically connected to the switch element group 170B corresponding to the second column of pixels 1302 is not turned on, only the data signal having a positive polarity output from the first signal output 191 is transmitted to the first color pixel 1011. Similarly, in the second period t2, although the second time signal line group CK2 is turned on, the first data output 191 and the second data output 192 are not turned on. Thus, there is no data signal having a positive polarity or negative transmitted to corresponding pixels until the third period t3, in which the data signal having a positive polarity output from the first data output 191 is transmitted to the first color pixels 1011 in the second pixel column unit 132. In the fourth period t4, similarly, the data signal with positive polarity output from the first data output 191 is not transmitted into the corresponding pixels, and the data signal with negative polarity output from the second data output 192 is not transmitted to the corresponding pixels.

During the second sub-cycle G2, that is, during scanning the second gate line 232, in the first period t1, although the first clock signal line group CK1 provides an enable signal so that first and second terminals of the corresponding switch element group are switched on, the first data output 191 and the second data output 192 do not work and no data signal with a positive or negative polarity is output to the corresponding pixels. In the second period t2, a data signal is provided to the second data output 192 and an enable signal is provided to the second clock signal line group CK2, so that the data signal having a negative polarity output from the second data output 192 is transmitted to the corresponding first color pixels 1011. The process in the third period t3 is similar to that in the first period t1 and the process in the fourth period t4 is similar to that in the second period t2, and thus no further description will be made herein.

Therefore, after the scanning for gate lines 23 of the entire display panel, that is, in the current frame, the polarity of the data signal received by some first color pixels 1011 is positive, and the polarity of the data signal received by some other first color pixels 1011 is negative. In the next frame, the scanning manner of gate lines 23 is the same as that in the previous frame, except that the polarity of the data signal output from the first data output 191 changes from positive to negative, and the polarity of the data signal output from the second data output 192 changes from negative to positive. In this way, the polarity of the data signal received by some first color pixels 1011 changes from positive to negative, and the polarity of the data signal received by other first color pixels 1011 changes from negative to positive, thereby avoiding the flicker phenomenon and thus improving the display quality of the display panel.

It should be noted that the driving method of the display panel shown in FIG. 13 is similar to the driving method of the display panel shown in FIG. 11. Only when a data output and a corresponding clock signal line group are both turned on, a data signal having a positive polarity or negative is transmitted to corresponding pixels. Therefore, it is still possible that in the current frame, the polarity of the data signal received by some pixels having a same color is positive, and the polarity of the data signal received by some other pixels having the same color is negative, so that in the polarity inversion process of the next frame, the polarity of the data signal received by some pixels having this color changes from positive to negative and the polarity of the data signal received by some other pixels having this color changes from negative to positive, thereby avoiding the flickering phenomenon.

Figure 14:
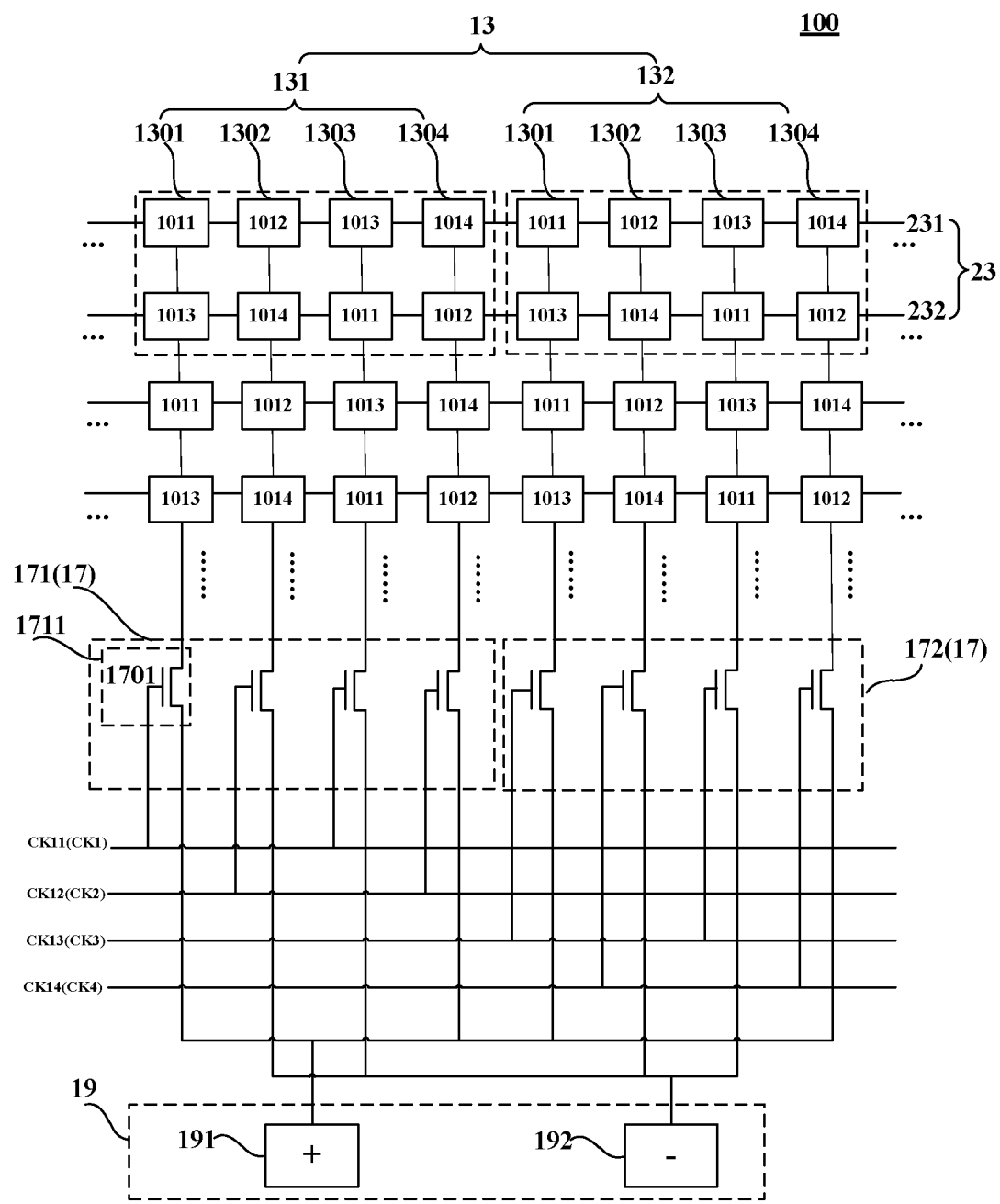
FIG. 14 is still a top view of another structural schematic diagram of a display panel according to an embodiment of the present disclosure.

In an embodiment, as shown in FIG. 14, which is still another structural schematic diagram of a display panel according to an embodiment of the present disclosure, each clock signal line group includes a clock signal line. That is, the first clock signal line group CK1 includes one clock signal line CK11, the second clock signal line group CK2 includes a clock signal line CK12, the third clock signal line group CK3 includes a clock signal line CK13, and the fourth clock signal line group CK4 includes a clock signal line CK14. Each switch element group 170 includes a switch element 1711, the control terminals 1701 of the four switch elements 1711 electrically connected to the first data output 191 are electrically connected to four clock signal lines in one-to-one correspondence, and the control terminals 1701 of the four switch elements 1711 electrically connected to the second data output 192 are electrically connected to four clock signal lines in one-to-one correspondence.

Since different color pixels may correspond to different data signals, data signals output from the data output may need to be different. Only outputting different data signals according to different colors in time division can achieve the normal display functions, and thus avoid inputting a same data signal to different color pixels at the same time, which may affect the display effect.

Further, the switch element 1711 in this embodiment can be an N-type thin film transistor or a P-type thin film transistor. When an N-type thin film transistor is used as the switch element 1711, the abovementioned clock signal line group outputs a high-level signal to control the switch element 1711 to be switched on, and when a P-type thin film transistor is used as the switch element 1711, the abovementioned clock signal line group outputs a low-level signal to control the switch element 1711 to be switched on. It should be noted that, by way of an example, FIG. 14 exemplifies the switch element 1711 as an N-type thin film transistor.

Figure 15:
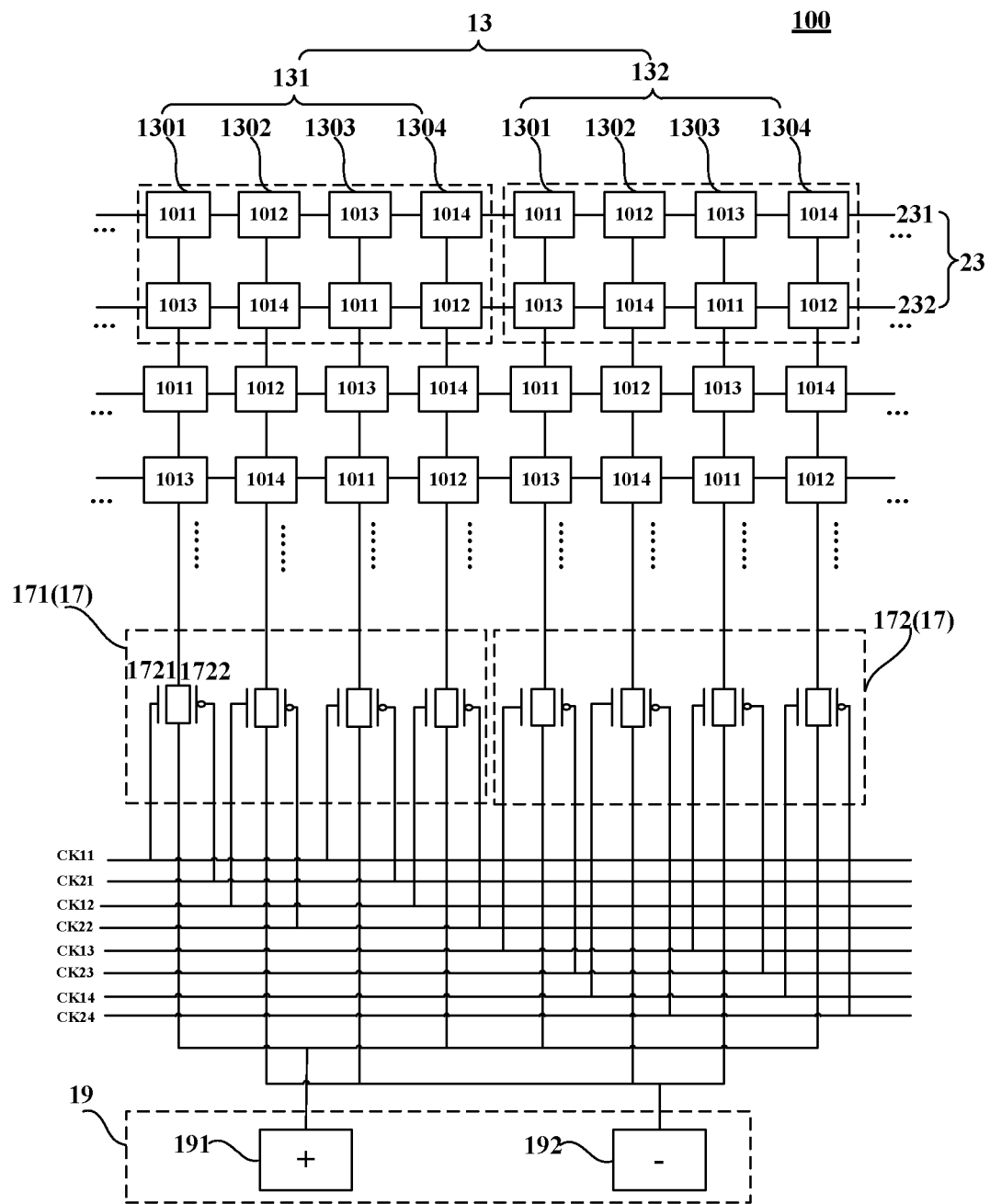
FIG. 15 is still a top view of another structural schematic diagram of a display panel according to an embodiment of the present disclosure.

In another embodiment, as shown in FIG. 15, which is still another structural schematic diagram of a display panel according to an embodiment of the present disclosure, each clock signal line group 21 in this embodiment includes two clock signal lines. That is, the first clock signal line group CK1 includes one clock signal line CK11 and one clock signal line CK21, the second clock signal line group CK2 includes one clock signal line CK12 and one clock signal line CK22, the third clock signal line group CK3 includes one clock signal line CK13 and one clock signal line CK23, and the fourth clock signal line group CK4 includes one clock signal line CK14 and one clock signal line CK24. In addition, each switch element group 170 includes a first switch element 1721 and a second switch element 1722. The type of the first switch element 1721 is different from the type of the second switch element 1722. For example, the first switch element 1721 can be an N-type thin film transistor, and the second switch element 1722 can be a P-type thin film transistor. In this embodiment, a switch element group is formed by a P-type thin film transistor and an N-type thin film transistor, so as to overcome the problem that there is a threshold loss when the P-type thin film transistor transmits a low-level signal, there is no threshold loss when the P-type thin film transistor transmits a high-level signal, there is a threshold loss when the N-type thin film transistor transmits a high-level signal and there is no threshold loss when the N-type thin film transistor transmits a low-level signal. In this embodiment, forming one switch element group by using a P-type thin film transistor and an N-type thin film transistor can achieve that there is no threshold loss no matter transmitting a high-level signal or transmitting a low-level signal.

Figure 16:
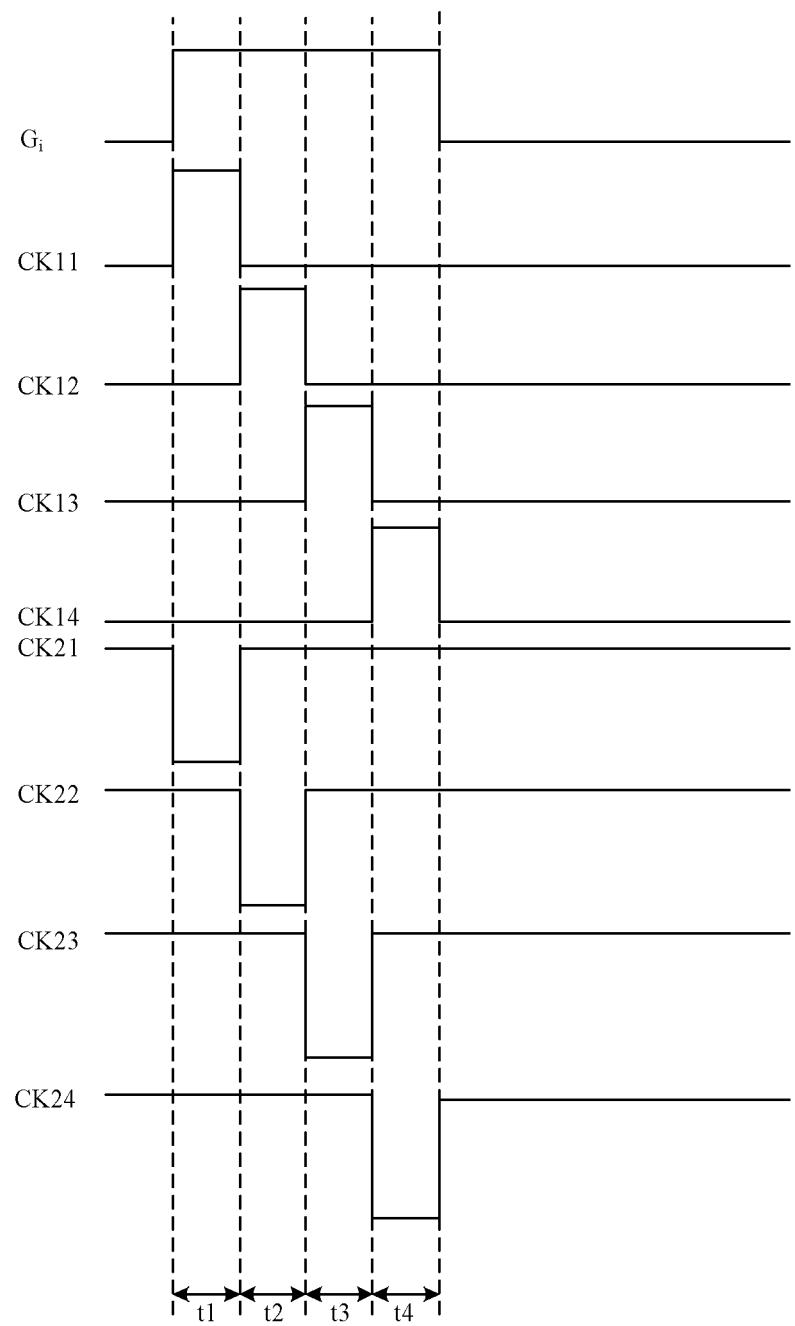
FIG. 16 is a time sequence of signals driving a display panel according to an embodiment of the present disclosure.

It should be noted that there are various connection manners between each clock signal line group and the switch element groups. For example, as shown in FIG. 15, according to the structure of the display panel shown in FIG. 15, a driving method is described. FIG. 16 is another time sequence of signals driving a display panel according to an embodiment of the present disclosure.

The driving method for the display panel will be described in the following.

When the display panel is operating, two adjacent frames are still taken as one polarity inversion cycle of the display panel.

When the first gate line is turned on, i.e., during the first sub-cycle G1, in the first period t1, the clock signal line CK11 and the clock signal line CK21 are turned on, the first terminal and second terminal of the first switch element 1721 electrically connected to the clock signal line CK11 are switched on, and the first terminal and second terminal of the second switch element 1722 electrically connected to the clock signal line CK21 are switched on, so that the data signal with positive polarity output from the first data output 191 is transmitted to the corresponding pixels. The process in the second period t2, the third period t3 and the fourth period t4 are similar to that in the abovementioned first period t1, and will not be further described herein. After the first period t1, the second period t2, the third period t3 and the fourth period t4, scanning for one gate line is completed. When the second gate line is turned on, i.e., during the second sub-cycle G2, the operating manner of the clock signal line is the same as the operating manner of the clock signal line when the first gate line is turned on, and will not be further described herein. It should be noted that, if the display panel includes i grid lines, a time period for scanning all of the i grid lines of the display panel is a frame time. In the current frame, the polarity of the data signal received by some pixels having a same color is positive, and the polarity of the data signal received by some other pixels having the same color is negative.

In the next frame, it is needed to scan all of the i gate lines included in the display panel again, and the scanning manner is the same as the scanning manner in the previous frame, except that the polarity of the data signal output from the first data output 191 in the previous frame changes from positive to negative and the polarity of the data signal output from the second data output 192 changes from negative to positive. When switching between two adjacent frames of images, the polarity of the data signal received by some pixels having a same color changes from positive to negative, and the polarity of the data signal received by some other pixels having the same color changes from negative to positive, thereby avoiding the flicker phenomenon and thus improving the image quality.

It should be noted that no matter which gate line is scanned, only if both the corresponding clock signal line and the corresponding data output are turned on, the data signal having a positive polarity or negative will be transmitted to the corresponding pixel(s).

In an embodiment, as shown in FIG. 15, a first color pixel 1011 and a third color pixel 1013 in the first column of pixels 1301 are repeatedly and alternatively arranged in the column direction, a second color pixel 1012 and a fourth color pixels 1014 in the second column of pixels 1302 are repeatedly and alternatively arranged in the column direction, a third color pixels 1013 and a first color pixels 1011 in the third column of pixels 1303 are repeatedly and alternatively arranged in the column direction, and a fourth color pixel 1014 and a second color pixels 1012 in the fourth column of pixels 1304 are repeatedly and alternatively arranged in the column direction. Further, in the first pixel column unit 131, colors of the four pixels in a same row are all different from one another; and in the second pixel column unit 132, colors of the four pixels in a same row are all different from one another. In this way, the uniformity of color mixture of the display panel is improved.

Further, the first color pixel 1011 can be a red pixel, the second color pixel 1012 can be a green pixel, the third color pixel 1013 can be a blue pixel, and the fourth color pixel 1014 can be a white pixel. In this embodiment, a white pixel with the high light transmittance is selected to increase the overall light transmittance of the display panel. In addition, when images with a same brightness are displayed, power consumption of the display panel can be decreased. Moreover, according to the abovementioned embodiments, in the first pixel column unit 131, colors of the four pixels in a same row are all different from one another; and in the second pixel column unit 132, colors of the four pixels in a same row are all different from one another. That is, every two adjacent pixels having a same color in a same row are separated by three pixels of other colors. For example, in the row direction, one red pixel closest to one red pixel in a first pixel column unit is located in a second pixel column unit adjacent to this first pixel column unit, and there is a green pixel, a blue pixel, and a white pixel between the two red pixels. It should be understood that, in the row direction, a red pixel, a green pixel, a blue pixel, and a white pixel are sequentially and cyclically arranged so as to prevent pixels having a same color from being too close to each other in the row direction. This can further improve the uniformity of color mixture in the display panel, and thus improve the display effect.

Further, an aperture area of the white pixel may be smaller than each of an aperture area of the red pixel, an aperture area of the green pixel, and an aperture area of the blue pixel. Since the light transmittance of the white pixel is higher than the light transmittance of other color pixels, the aperture area of the white pixel can be set to be smaller than the aperture area of other color pixels, so that the light transmittance of a pixel corresponding to each color can be balanced, especially when a solid color image is changed, this can avoid a significant difference in brightness.

In addition, since the white pixel has a smaller aperture area, its corresponding charging time is shorter, and the power consumption of the display panel can be decreased.

In an embodiment, as shown in FIG. 1, the display panel 100 in this embodiment may be a liquid crystal display panel. The related description above can be referred for its structure and display principle.

Figure 17:
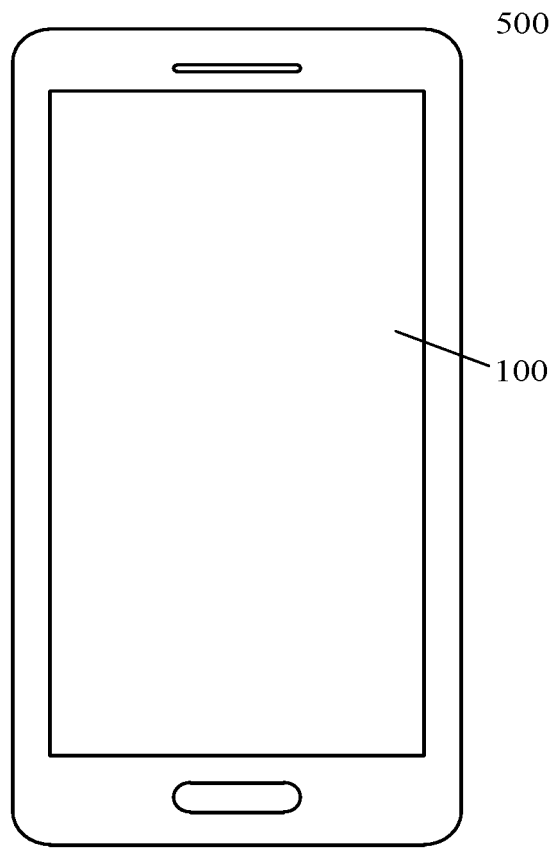
FIG. 17 is a structural schematic diagram of a display device according to an embodiment of the present disclosure.

The present disclosure provides a display device, as shown in FIG. 17, which is a structural schematic diagram of a display device according to an embodiment of the present disclosure. The display device 500 includes a display panel 100 described in the above embodiments. It should be noted that, FIG. 17 uses a cellphone as an example of a display device. However, the display device is not limited to a cellphone, and can include but is not limited to any electronic device with a display function such as a personal computer (PC), a personal digital assistant (PDA), a wireless handheld device, a tablet computer, an MP4 player, or a television.

The display device 500 in this embodiment includes the display panel described in the above embodiments. Therefore, the display device can also realize all the functions of the above display panel. Similarly, the display device can have the following beneficial effects.

The data signal received by some pixels having a same color can change from a first signal to a second signal, and the data signal received by other pixels having the same color can change from the second signal to the first signal. The polarity of the first signal is opposite to the polarity of the second signal. In this way, when switching between two adjacent frames, it can avoid the flickering phenomenon due to significant non-uniform brightness caused by a polarity of a data signal received by all pixels having a same color changing from one polarity to another polarity for the entire image, thereby improving the display quality.

Compared with the related art, the embodiments of the present disclosure can avoid the flickering phenomenon due to the significant non-uniform brightness caused by a polarity of a data signal received by all pixels having a same color changing from one polarity to another polarity for the entire image while switching between two adjacent frames of images, thereby improving the display quality. In addition, when an inversion is performed on to the display panel, that is, from a first period of polarity inversion to a second period of polarity inversion for the display panel, the data signal received by some pixels having a same color changes from a first signal to a second signal, and the data signal received by some other pixels having the same color changes from the second signal to the first signal, thereby avoiding the flickering phenomenon caused by signals received by all pixels having a same color changing from one polarity to another polarity for the entire image.

Finally, it should be noted that, the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A display panel, comprising:
   N pixel column unit groups, wherein each of the N pixel column unit groups comprises a first pixel column unit and a second pixel column unit;
      wherein each of the first pixel column unit and the second pixel column unit comprises a first column of pixels, a second column of pixels, a third column of pixels, and a fourth column of pixels;
      wherein all colors of pixels of the first column of pixels are identical to all colors of pixels of the third column of pixels and all colors of pixels of the second column of pixels are identical to all colors of pixels of the fourth column of pixels, wherein pixels in the N pixel column unit groups comprises first color pixels, second color pixels, third color pixels, and fourth color pixels;
   N data line unit groups corresponding to the N pixel column unit groups in one-to-one correspondence,
      wherein each of the N data line unit groups comprises a first data line unit and a second data line unit;
      wherein each of the first data line unit and the second data line unit comprises four data lines; wherein the four data lines in the first data line unit of each of the N data line unit groups are electrically connected to the first column of pixels, the second column of pixels, the third column of pixels, and the fourth column of pixels in the first pixel column unit of a corresponding pixel column unit group of the N pixel column unit group in one-to-one correspondence, and
      wherein the four data lines in the second data line unit of each of the N data line unit groups are electrically connected to the first column of pixels, the second column of pixels, the third column of pixels, and the fourth column of pixels in the second pixel column unit of a corresponding pixel column unit group of the N pixel column unit group in one-to-one correspondence, N driving unit groups corresponding to the N data line unit groups in one-to-one correspondence, wherein each of the N driving unit groups comprises a first driving unit and a second driving unit, and wherein each of the first driving unit and the second driving unit comprises four switch element groups, each having a first terminal and a second terminal;

wherein the first terminals of the four switch element groups in the first driving unit of each of the N driving unit groups are electrically connected to said four data lines in the first data line unit of a corresponding data line unit group of the N data line unit groups in one-to-one correspondence;

wherein the first terminals of the four switch element groups in the second driving unit of each of the N driving unit groups are electrically connected to said four data lines in a second data line unit of a corresponding data line unit group of the N data line unit groups in one-to-one correspondence; and N data output groups corresponding to the N driving unit groups in one-to-one correspondence, wherein each of the N data output groups comprises a first data output and a second data output; and wherein a polarity of a data signal output from the first data output is opposite to a polarity of a data signal output from the second data output;

wherein the second terminals of two switch element groups in the first driving unit of each of the N driving unit groups are electrically connected to the first data output of a corresponding data output group of the N data output groups, and the second terminals of the other two switch element groups in the first driving unit of each of the N driving unit groups are electrically connected to the second data output of the corresponding data output group of the N data output groups; and wherein at least one color of pixels in one column of two columns of pixels corresponding to the two switch element groups of the first driving unit connected to the first data output are different from at least one color of pixels in the other one column of the two columns of pixels corresponding to the two switch element groups of the first driving unit connected to the first data output, and at least one color of pixels of one column of the other two columns of pixels corresponding to the other two switch element groups of the first driving unit connected to the second data output are different from at least one color of pixels of the other one column of the other two columns of pixels corresponding to the other two switch element groups of the first driving unit connected to the second data output;

wherein the second terminals of two switch element groups in the second driving unit of each of the N driving unit groups are electrically connected to the first data output of a corresponding data output group of the N data output groups, and the second terminals of the other two switch element groups in the second driving unit of each of the N driving unit groups are electrically connected to the second data output of the corresponding data output group of the N data output groups; and wherein at least one color of pixels in one column of two columns of pixels corresponding to the two switch element groups of the second driving unit connected to the first data output are different from at least one color of pixels in the other one column of the two columns of pixels corresponding to the two switch element groups of the second driving unit connected to the first data output, and at least one color of pixels in one column of the other two columns of pixels corresponding to the other two switch element groups of the second driving unit connected to the second data output are different from at least one color of pixels in the other one column of the other two columns of pixels corresponding to the other two switch element groups of the second driving unit connected to the second data output, and wherein N is a positive integer;

wherein the first pixel column unit and the second pixel column unit in each of the N pixel column unit groups are spaced apart from each other;

wherein data signals received by pixels having a same color in a same row have a same polarity;

wherein the data line in the first data line unit of each of the N data line unit groups electrically connected to the first column of pixels and the data line in the first data line unit of each of the N data line unit groups electrically connected to the second column of pixels are electrically connected to a respective first data output through the corresponding switch element groups; and wherein the data line in the first data line unit of each of the N data line unit groups is electrically connected to the third column of pixels and the data line in the first data line unit of each of the N data line unit groups electrically connected to the fourth column of pixels are electrically connected to the second data output through corresponding switch element groups.

2. The display panel according to claim 1, further comprising four clock signal line groups, wherein control terminals of four switch element groups electrically connected to the first data output are electrically connected to the four clock signal line groups in one-to-one correspondence, and control terminals of four switch element groups electrically connected to the second data output are electrically connected to the four clock signal line groups in one-to-one correspondence.

3. The display panel according to claim 2, wherein control terminals of the four switch element groups corresponding to the four data lines in the first data line unit are electrically connected to the four clock signal line groups in one-to-one correspondence, and control terminals of the four switch element groups corresponding to the four data lines in the second data line unit are electrically connected to the four clock signal line groups in one-to-one correspondence.

4. The display panel according to claim 2, wherein control terminals of the four switch element groups corresponding to the four data lines in the first data line unit are electrically connected to two of the four clock signal line groups, and control terminals of the four switch element groups corresponding to the four data lines in the second data line unit are electrically connected to the other two of the four clock signal line groups.

5. The display panel according to claim 2, wherein each of the four clock signal line groups comprises one clock signal line wherein each switch element group of the N driving unit groups comprises one switch element wherein control terminals of the four switch elements electrically connected to the first data output are electrically connected to four clock signal lines of the four clock signal line groups in one-to-one correspondence and wherein control terminals of the four switch elements electrically connected to the second data output are electrically connected to the four clock signal lines in one-to-one correspondence.

6. The display panel according to claim 1, wherein a first color pixel and a third color pixel are repeatedly and alternatively arranged along a column direction in the first column of pixels, a second color pixel and a fourth color pixel are repeatedly and alternatively arranged along the column direction in the second column of pixels, a third color pixel and a first color pixel are repeatedly and alternatively arranged along the column direction in the third column of pixels, and a fourth color pixel and a second color pixel are repeatedly and alternatively arranged along the column direction in the fourth column of pixels; and colors of four pixels in a same row in the first pixel column unit are all different from one another, and colors of four pixels in a same row in the second pixel column unit are all different from one another.

7. The display panel according to claim 1, wherein the first color pixel is a red pixel, the second color pixel is a green pixel, the third color pixel is a blue pixel, and the fourth color pixel is a white pixel.

8. The display panel according to claim 7, wherein an aperture area of the white pixel is smaller than each of an aperture area of the red pixel, an aperture area of the green pixel and an aperture area of the blue pixel.

9. The display panel according to claim 1, wherein
the data signal output from the first data output has a positive polarity, and the data signal output from the second data output has a negative polarity; or
the data signal output from the first data output has a negative polarity, and the data signal output from the second data output has a positive polarity.

10. The display panel according to claim 1, wherein the display panel is a liquid crystal display panel.

11. A display device, comprising a display panel, wherein the display panel comprises:
N pixel column unit groups, wherein each of the N pixel column unit groups comprises a first pixel column unit and a second pixel column unit;
wherein each of the first pixel column unit and the second pixel column unit comprises a first column of pixels, a second column of pixels, a third column of pixels, and a fourth column of pixels;
wherein all colors of pixels of the first column of pixels are identical to all colors of pixels of the third column of pixels and all colors of pixels of the second column of pixels are identical to all colors of pixels of the fourth column of pixels, wherein pixels in the N pixel column unit groups comprises first color pixels, second color pixels, third color pixels, and fourth color pixels;
N data line unit groups corresponding to the N pixel column unit groups in one-to-one correspondence, wherein each of the N data line unit groups comprises a first data line unit and a second data line unit;
wherein each of the first data line unit and the second data line unit comprises four data lines; wherein the four data lines in the first data line unit of each of the N data line unit groups are electrically connected to the first column of pixels, the second column of pixels, the third column of pixels, and the fourth column of pixels in the first pixel column unit of a corresponding pixel column unit group of the N pixel column unit group in one-to-one correspondence, and
wherein the four data lines in the second data line unit of each of the N data line unit groups are electrically connected to the first column of pixels, the second column of pixels, the third column of pixels, and the fourth column of pixels in the second pixel column unit of a corresponding pixel column unit group of the N pixel column unit group in one-to-one correspondence,
N driving unit groups corresponding to the N data line unit groups in one-to-one correspondence, wherein each of the N driving unit groups comprises a first driving unit and a second driving unit, and wherein each of the first driving unit and the second driving unit comprises four switch element groups, each having a first terminal and a second terminal;
wherein the first terminals of the four switch element groups in the first driving unit of each of the N driving unit groups are electrically connected to said four data lines in the first data line unit of a corresponding data line unit group of the N data line unit groups in one-to-one correspondence;
wherein the first terminals of the four switch element groups in the second driving unit of each of the N driving unit groups are electrically connected to said four data lines in a second data line unit of a corresponding data line unit group of the N data line unit groups in one-to-one correspondence; and
N data output groups corresponding to the N driving unit groups in one-to-one correspondence,
wherein each of the N data output groups comprises a first data output and a second data output; and wherein a polarity of a data signal output from the first data output is opposite to a polarity of a data signal output from the second data output;
wherein the second terminals of two switch element groups in the first driving unit of each of the N driving unit groups are electrically connected to the first data output of a corresponding data output group of the N data output groups, and the second terminals of the other two switch element groups in the first driving unit of each of the N driving unit groups are electrically connected to the second data output of the corresponding data output group of the N data output groups; and
wherein at least one color of pixels in one column of two columns of pixels corresponding to the two switch element groups of the first driving unit connected to the first data output are different from at least one color of pixels in the other one column of the two columns of pixels corresponding to the two switch element groups of the first driving unit connected to the first data output, and at least one color of pixels of one column of the other two columns of pixels corresponding to the other two switch element groups of the first driving unit connected to the second data output are different from at least one color of pixels of the other one column of the other two columns of pixels corresponding to the other two switch element groups of the first driving unit connected to the second data output;
wherein the second terminals of two switch element groups in the second driving unit of each of the N driving unit groups are electrically connected to the first data output of a corresponding data output group of the N data output groups, and the second terminals of the other two switch element groups in the second driving unit of each of the N driving unit groups are electrically connected to the second data output of the corresponding data output group of the N data output groups; and wherein at least one color of pixels in one column of two columns of pixels corresponding to the two switch element groups of the second driving unit connected to the first data output are different from at least one color of pixels in the other one column of the two columns of pixels corresponding to the two switch element groups of the second driving unit connected to the first data output, and at least one color of pixels in one column of the other two columns of pixels corresponding to the other two switch element groups of the second driving unit connected to the second data output are different from at least one color of pixels in the other one column of the other two columns of pixels corresponding to the other two switch element groups of the second driving unit connected to the second data output, and wherein N is a positive integer;

wherein the first pixel column unit and the second pixel column unit in each of the N pixel column unit groups are spaced apart from each other, and wherein data signals received by pixels having a same color in a same row have a same polarity;

wherein the data line in the first data line unit of each of the N data line unit groups electrically connected to the first column of pixels and the data line in the first data line unit of each of the N data line unit groups electrically connected to the second column of pixels are electrically connected to a respective first data output through the corresponding switch element groups; and wherein the data line in the first data line unit of each of the N data line unit groups is electrically connected to the third column of pixels and the data line in the first data line unit of each of the N data line unit groups electrically connected to the fourth column of pixels are electrically connected to the second data output through corresponding switch element groups.

12. A driving method for driving a display panel, wherein the display panel comprises:

N pixel column unit groups, wherein each of the N pixel column unit groups comprises a first pixel column unit and a second pixel column unit;

wherein each of the first pixel column unit and the second pixel column unit comprises a first column of pixels, a second column of pixels, a third column of pixels, and a fourth column of pixels;

wherein all colors of pixels of the first column of pixels are identical to all colors of pixels of the third column of pixels and all colors of pixels of the second column of pixels are identical to all colors of pixels of the fourth column of pixels, wherein pixels in the N pixel column unit groups comprises first color pixels, second color pixels, third color pixels, and fourth color pixels;

N data line unit groups corresponding to the N pixel column unit groups in one-to-one correspondence, wherein each of the N data line unit groups comprises a first data line unit and a second data line unit;

wherein each of the first data line unit and the second data line unit comprises four data lines; wherein the four data lines in the first data line unit of each of the N data line unit groups are electrically connected to the first column of pixels, the second column of pixels, the third column of pixels, and the fourth column of pixels in the first pixel column unit of a corresponding pixel column unit group of the N pixel column unit group in one-to-one correspondence, and wherein the four data lines in the second data line unit of each of the N data line unit groups are electrically connected to the first column of pixels, the second column of pixels, the third column of pixels, and the fourth column of pixels in the second pixel column unit of a corresponding pixel column unit group of the N pixel column unit group in one-to-one correspondence, N driving unit groups corresponding to the N data line unit groups in one-to-one correspondence, wherein each of the N driving unit groups comprises a first driving unit and a second driving unit, and wherein each of the first driving unit and the second driving unit comprises four switch element groups, each having a first terminal and a second terminal;

wherein the first terminals of the four switch element groups in the first driving unit of each of the N driving unit groups are electrically connected to said four data lines in the first data line unit of a corresponding data line unit group of the N data line unit groups in one-to-one correspondence;

wherein the first terminals of the four switch element groups in the second driving unit of each of the N driving unit groups are electrically connected to said four data lines in a second data line unit of a corresponding data line unit group of the N data line unit groups in one-to-one correspondence; and N data output groups corresponding to the N driving unit groups in one-to-one correspondence, wherein each of the N data output groups comprises a first data output and a second data output; and wherein a polarity of a data signal output from the first data output is opposite to a polarity of a data signal output from the second data output;

wherein the second terminals of two switch element groups in the first driving unit of each of the N driving unit groups are electrically connected to the first data output of a corresponding data output group of the N data output groups, and the second terminals of the other two switch element groups in the first driving unit of each of the N driving unit groups are electrically connected to the second data output of the corresponding data output group of the N data output groups; and wherein at least one color of pixels in one column of two columns of pixels corresponding to the two switch element groups of the first driving unit connected to the first data output are different from at least one color of pixels in the other one column of the two columns of pixels corresponding to the two switch element groups of the first driving unit connected to the first data output, and at least one color of pixels of one column of the other two columns of pixels corresponding to the other two switch element groups of the first driving unit connected to the second data output are different from at least one color of pixels of the other one column of the other two columns of pixels corresponding to the other two switch element groups of the first driving unit connected to the second data output;

wherein the second terminals of two switch element groups in the second driving unit of each of the N driving unit groups are electrically connected to the first data output of a corresponding data output group of the N data output groups, and the second terminals of the other two switch element groups in the second driving unit of each of the N driving unit groups are electrically connected to the second data output of the corresponding data output group of the N data output groups; and wherein at least one color of pixels in one column of two columns of pixels corresponding to the two switch element groups of the second driving unit connected to the first data output are different from at least one color of pixels in the other one column of the two columns of pixels corresponding to the two switch element groups of the second driving unit connected to the first data output, and at least one color of pixels in one column of the other two columns of pixels corresponding to the other two switch element groups of the second driving unit connected to the second data output are different from at least one color of pixels in the other one column of the other two columns of pixels corresponding to the other two switch element groups of the second driving unit connected to the second data output, and wherein N is a positive integer;

wherein the first pixel column unit and the second pixel column unit in each of the N pixel column unit groups are spaced apart from each other, and wherein data signals received by pixels having a same color in a same row have a same polarity;

wherein the data line in the first data line unit of each of the N data line unit groups electrically connected to the first column of pixels and the data line in the first data line unit of each of the N data line unit groups electrically connected to the second column of pixels are electrically connected to a respective first data output through the corresponding switch element groups; and wherein the data line in the first data line unit of each of the N data line unit groups is electrically connected to the third column of pixels and the data line in the first data line unit of each of the N data line unit groups electrically connected to the fourth column of pixels are electrically connected to the second data output through corresponding switch element groups;

wherein the driving method for the display panel comprises steps of:

providing the first data output and the second data output of each of the N data output groups with data signals having opposite polarities; and providing an enable signal to each of the four switch element groups in the first driving unit and the four switch element groups in the second driving unit of each of the N driving unit groups, wherein a first terminal and a second terminal of each of the four switch element groups in the first driving unit and the four switch element groups in the second driving unit of each of the N driving unit groups are switched on, and the data signals are transmitted to respective columns of pixels.

13. The driving method for the display panel according to claim 12, wherein the display panel further comprises a plurality of gate lines, wherein a scanning time for every two adjacent gate lines of the plurality of gate lines is one cycle, a scanning time for a previous one of the two adjacent gate lines is a first sub-cycle, and scanning time for the remaining one of the two adjacent gate lines is a second sub-cycle;

wherein the display panel further comprises four clock signal line groups:

wherein control terminals of four switch element groups electrically connected to the first data output are electrically connected to the four clock signal line groups in one-to-one correspondence, and control terminals of four switch element groups electrically connected to the second data output are electrically connected to the four clock signal line groups in one-to-one correspondence, and wherein the driving method for the display panel further comprises steps of:

during the first sub-cycle, providing a data signal to the first data output of each of the N data output groups, and providing an enable signal to each of the four clock signal line groups; and during the second sub-cycle, providing a data signal to the second data output of each of the N data output groups, and providing an enable signal to each of the four clock signal line groups.

14. The driving method for the display panel according to claim 13, wherein the data signal provided to the first data output during the first sub-cycle has a positive polarity, and the data signal provided to the second data output during the second sub-cycle has a negative polarity.

15. The driving method for the display panel according to claim 13, wherein the data signal provided to the first data output during the first sub-cycle has a negative polarity, and the data signal provided to the second data output during the second sub-cycle has a positive polarity.

* * * * *